US012475541B2

(12) United States Patent
Kawabe et al.

(10) Patent No.: US 12,475,541 B2
(45) Date of Patent: Nov. 18, 2025

(54) BLEMISH EVALUATION METHOD, DROPLET EVALUATION METHOD, REPELLENT EVALUATION METHOD, AND REPELLENT EVALUATION DEVICE

(71) Applicant: DAIKIN INDUSTRIES, LTD., Osaka (JP)

(72) Inventors: Rumi Kawabe, Osaka (JP); Shuuto Yamagata, Osaka (JP); Ikuo Yamamoto, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 481 days.

(21) Appl. No.: 17/846,395

(22) Filed: Jun. 22, 2022

(65) Prior Publication Data
US 2022/0327669 A1 Oct. 13, 2022

Related U.S. Application Data

(63) Continuation of application No. PCT/JP2020/042993, filed on Nov. 18, 2020.

(30) Foreign Application Priority Data

Dec. 25, 2019 (JP) ................................ 2019-234074

(51) Int. Cl.
G06T 5/50 (2006.01)
G06T 5/70 (2024.01)
(Continued)

(52) U.S. Cl.
CPC ................. *G06T 5/70* (2024.01); *G06T 5/50* (2013.01); *G06T 5/90* (2024.01); *G06T 7/0008* (2013.01);
(Continued)

(58) Field of Classification Search
CPC .... G06T 5/70; G06T 5/50; G06T 5/90; G06T 7/0008; G06T 7/70; G06T 2207/20081; G06T 2207/30148; G06V 10/44
See application file for complete search history.

(56) References Cited

U.S. PATENT DOCUMENTS 7,162,073 B1 * 1/2007 Akgul ................... G06T 7/0004
356/73.1
7,535,501 B1 * 5/2009 Loushin ............... H04N 23/811
348/246

FOREIGN PATENT DOCUMENTS

CN 104392441 A * 3/2015 ........... G06T 7/0004
CN 104568676 A 4/2015
(Continued)

OTHER PUBLICATIONS

AATCC Test Method 22-2010, "Water Repellency: Spray Test", 2011, American Association of Textile Chemist and Colorists (AATCC), XP093105412, pp. 67-79 (3 pages) (Year: 2011).*
(Continued)

Primary Examiner — Stephen R Koziol
Assistant Examiner — Ashley L. Hytrek
(74) Attorney, Agent, or Firm — Sughrue Mion, PLLC

(57) ABSTRACT

An evaluation method for evaluating a spot generated on a substrate that has been treated with a repellent, the method includes an acquiring step of acquiring image data including data on the substrate that has been treated with the repellent to be evaluated, a spot-detecting step of creating a smoothed image from the image data, binarizing the smoothed image and detecting a region of a spot generated on the substrate, and a spot-evaluating step of determining an evaluation value of the spot according to an area of the region of the spot detected. Also disclosed is a repellent evaluation device including an acquire, a classifier, a detector and an evaluator.

11 Claims, 24 Drawing Sheets

(51) Int. Cl.
  *G06T 5/90* (2024.01)
  *G06T 7/00* (2017.01)
  *G06T 7/70* (2017.01)
(52) U.S. Cl.
  CPC ...... *G06T 7/70* (2017.01); *G06T 2207/20081* (2013.01); *G06T 2207/30148* (2013.01)

(56) References Cited

FOREIGN PATENT DOCUMENTS

| | | | | | |
|---|---|---|---|---|---|
| CN | 106407928 | B | * | 9/2019 | ............. G06V 20/13 |
| JP | 2001-145128 | A | | 5/2001 | |
| JP | 2004-37399 | A | | 2/2004 | |
| JP | 2004-056586 | A | | 2/2004 | |
| JP | 2004037399 | A | * | 2/2004 | |
| JP | 2005265785 | A | * | 9/2005 | |
| JP | 2009-293993 | A | | 12/2009 | |
| JP | 2015-29174 | A | | 2/2015 | |
| JP | 2017-211259 | A | | 11/2017 | |

OTHER PUBLICATIONS

"Water Repellency: Spray Test", AATCC Technical Manual, 2005, pp. 65-67, TM 22-2001.
Xinbo Huang et al., "Study on Hydrophobicity Detection of Composite Insulators of Transmission Lines by Image Analysis", IEEE Access, Jun. 12, 2019, pp. 84516-84523, vol. 7.
International Search Report for PCT/JP2020/042993 dated, Jan. 19, 2021 (PCT/ISA/210).
AATCC Test Method 22-2010, " Water Repellency: Spray Test", 2011, American Association of Textile Chemists and Colorists (AATCC), XP093105412, pp. 67-69 (3 pages).
Extended European Search Report dated Dec. 6, 2023 in European counterpart Application No. 20904530.1.
International Preliminary Report on Patentability dated Jun. 28, 2022 with a Translation of the Written Opinion of the International Searching Authority in Application No. PCT/JP2020/042993.
Yihang BO, "Fundamentals of Digital Imaging Programs, from a Rectangle to a Drawing Processing Language Edition", Beijing: China Film Press, published Oct. 31, 2017, pp. 145-149 (11 pages total).

* cited by examiner

BLEMISH EVALUATION METHOD, DROPLET EVALUATION METHOD, REPELLENT EVALUATION METHOD, AND REPELLENT EVALUATION DEVICE

CROSS REFERENCE TO RELATED APPLICATIONS

This is a Rule 53(b) Continuation of International Application No. PCT/JP2020/042993 filed Nov. 18, 2020, which claims priority from Japanese Patent Application No. 2019-234074 filed Dec. 25, 2019. All the content of Japanese Patent Application No. 2019-234074 filed Dec. 25, 2019 is incorporated herein by reference.

FIELD OF THE INVENTION

The present disclosure relates to a spot evaluation method, a water drop evaluation method, a repellent evaluation method, and a repellent evaluation device, which are for evaluating the performance of a repellent.

BACKGROUND ART

Evaluation of the performance of a repellent is generally carried out by a method including spraying water on a substrate that has been treated with the repellent, and visually comparing the result with predetermined criteria to determine an evaluation value thereof (see, for example, "Water Repellency: Spray Test", published by American Association of Textile Chemists and Colorists, AATCC Technical Manual/2005, p. 65-67, 2005). Specifically, the fact of the matter is that evaluation of the performance of a repellent is a relative evaluation on the evaluation criteria in accordance with Test Method-22 of AATCC (American Association of Textile Chemists and Colorists), the evaluation criteria in accordance with JIS (Japanese Industrial Standard) L-1092, or the evaluation criteria in accordance with ISO (International Organization for Standardization) 4920.

Generally, evaluation of performance is preferably quantitative evaluation. JP 2009-293993A discloses a technique for evaluating a corrosion level. In a technique disclosed in JP 2009-293993A, a support vector machine is utilized, which enables quantitative evaluation.

SUMMARY

The present disclosure provides a spot evaluation method, a water drop evaluation method, a repellent evaluation method, and a repellent evaluation device, which are for quantitatively evaluating the performance of a repellent.

The spot evaluation method according to the present disclosure is an evaluation method for evaluating a spot generated on a substrate that has been treated with a repellent, the method including an acquiring step of acquiring image data including data on the substrate that has been treated with the repellent to be evaluated; a spot-detecting step of creating a smoothed image from the image data, binarizing the smoothed image, and detecting a region of a spot generated on the substrate; and a spot-evaluating step of determining an evaluation value of the spot according to an area of the region of the spot detected.

The spot evaluation method, the water drop evaluation method, the repellent evaluation method, and the repellent evaluation device according to the present disclosure enable quantitative evaluation when evaluating a repellent.

DESCRIPTION OF EMBODIMENTS

The spot evaluation method, the water drop evaluation method, the repellent evaluation method, and the repellent evaluation device according to respective embodiments will be described below with reference to figures. The spot evaluation method according to the present disclosure is for evaluating "a spot" generated on a substrate that has been treated with the repellent. The water drop evaluation method is for evaluating "a water drop" generated on a substrate that has been treated with the repellent. The repellent evaluation method and the repellent evaluation device are for evaluating the performance of the repellent used for treating a substrate. In the description hereinafter, the same reference sign is given to the same constituent, and the description therefor will be omitted.

Figure 1:
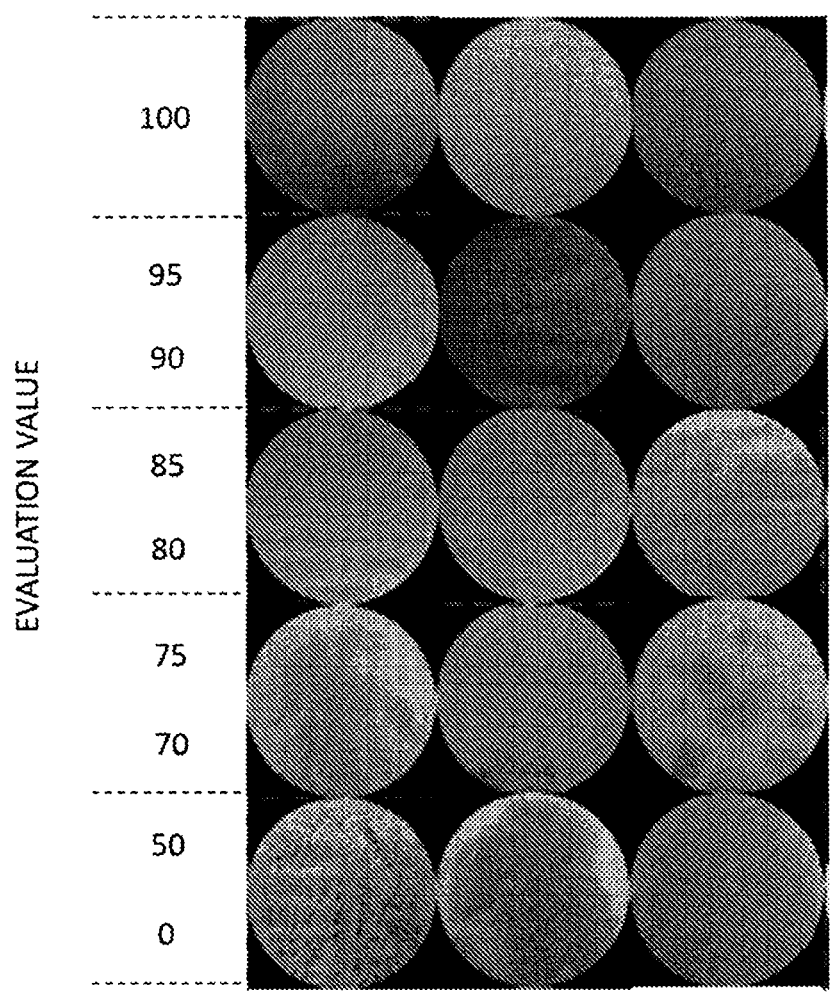
FIG. 1 is a list showing the relation between images and evaluation values, the relation illustrating general evaluation of a repellent.

A "repellent" herein is defined as a substance for treating a substrate, such as a fiber, for the purpose of water repellency, oil repellency, stain resistance, or the like. In evaluation of a repellent, a fiber as a substrate is treated with a predetermined amount of the repellent, and a predetermined amount of water is sprayed thereon. In the evaluation, the state of the spot and water drop remaining on the substrate after spraying water is compared with a predetermined criteria including a relation between images and evaluation values as shown in FIG. 1, for example. Thus, the evaluation value associated with the criteria that is within the range at almost the same level as the result of a case is selected to thereby evaluate repellents relatively. The "evaluation value" set herein is points in accordance with, for example, AATTC.

(Repellent)

In the present disclosure, the repellent preferably imparts water-repellency to a substrate, or in other words, is preferably a "water-repellent". The repellent preferably includes a repellent polymer, a solvent, and a surfactant.

The repellent polymer is selected from a repellent fluoropolymer and a repellent non-fluoropolymer. The repellent fluoropolymer and the repellent non-fluoropolymer are each preferably an acrylate-based polymer, a silicone-based polymer, or a urethane-based polymer.

The acrylate-based fluoropolymer is preferably an acrylate-based fluoropolymer having a repeating unit derived from a fluoromonomer represented by the following formula:

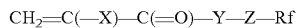

wherein X is a hydrogen atom, a monovalent organic group, or a halogen atom,
Y is —O— or —NH—,
Z is a direct bond or a divalent organic group, and
Rf is a fluoroalkyl group having 1 to 6 carbon atoms.

In an embodiment, the repellent non-fluoropolymer is preferably selected from an acrylate-based non-fluoropolymer having a repeating unit derived from a long chain (meth)acrylate ester monomer represented by the formula:

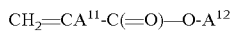

wherein $A^{11}$ is a hydrogen atom or a methyl group,
$A^{12}$ is a linear or branched aliphatic hydrocarbon group having 10 to 40 carbon atoms; and
acrylate-based non-fluoropolymer having a repeating unit derived from an amide group-containing monomer represented by the following formula:

[Chem 1]

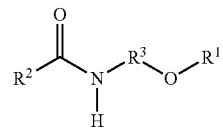

wherein $R^1$ is an organic residual group having an ethylenically unsaturated polymerizable group,
$R^2$ is a hydrocarbon group having 7 to 30 carbon atoms, and
$R^3$ is a hydrocarbon group having 1 to 5 carbon atoms.

In another embodiment, the repellent non-fluoropolymer may be a non-fluoropolymer disclosed in JP 2016-524628A. Such a non-fluoropolymer may be, for example, a urethane-based polymer represented by the following formula:

[Chem 2]

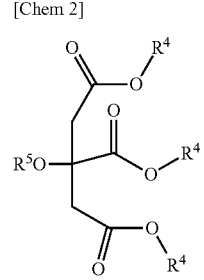

wherein $R^4$ are each independently —H, a linear or branched alkyl group having 6 to 30 carbon atoms and optionally including at least one unsaturated bond, or a combination thereof;

each n' is independently 0 to 20,
each m' is independently 0 to 20,
m'+n' is more than 0,
$R^5$ is —C(O)$R^6$,
$R^6$ are each independently a linear or branched alkyl group having 5 to 29 carbon atoms and optionally including at least one unsaturated bond, and
$R^7$ are independently —H or a linear or branched alkyl group having 6 to 30 carbon atoms and, if desired, including at least one unsaturated bond.

In another embodiment, the repellent non-fluoropolymer may be a non-fluoropolymer disclosed in JP 2006-328624A. Such non-fluoropolymer may be, for example, a non-fluoropolymer including, as a monomer unit, a (meth)acrylate having an ester moiety having 12 or more carbon atoms, wherein the percentage of the (meth)acrylate to the total of the monomer units constituting the non-fluoropolymer is 80 to 100 mass % and the non-fluoropolymer has a weight average molecular weight of 100,000 or more and a melt viscosity of 1,000 Pas or less at 160° C.

In another embodiment, the repellent non-fluoropolymer may be a non-fluoropolymer disclosed in JP 2017-025440A. Such non-fluoropolymer may be a non-fluoropolymer containing a constituent unit derived from a (meth)acrylate monomer represented by, for example, the following formula:

[Chem 3]

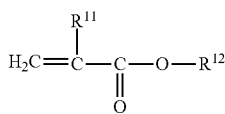

(A-1)

wherein $R^{11}$ represents hydrogen or a methyl group, and $R^{12}$ represents a monovalent hydrocarbon group having or more carbon atoms and optionally having a substituent; and a constituent unit derived from at least any one monomer of vinyl chloride and vinylidene chloride.

In the above-described embodiments, the non-fluoropolymer may be preferably a non-fluoropolymer further containing another constituent unit derived from at least one reactive emulsifier selected from (B1) a compound represented by the following general formula (I-1) and having an HLB of 7 to 18, (B2) a compound represented by the following general formula (II-1) and having an HLB of 7 to 18, and (B3) a compound having an HLB of 7 to 18 and obtained by adding an alkylene oxide having 2 to 4 carbon atoms to an oil/fat having an hydroxyl group and a polymerizable unsaturated group.

[Chem 4]

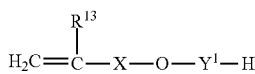

(I-1)

wherein $R^{13}$ represents hydrogen or a methyl group, X represents a linear or branched alkylene group having 1 to 6 carbon atoms, and Y1 represents a divalent group including an alkyleneoxy group having 2 to 4 carbon atoms.

[Chem 5]

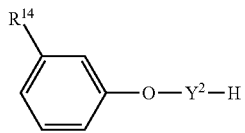

(II-1)

wherein $R^{14}$ represents an unsaturated monovalent hydrocarbon group having a polymerizable unsaturated group and 13 to 17 carbon atoms, and $Y^2$ represents a divalent group including an alkyleneoxy group having 2 to 4 carbon atoms.

In another embodiment, the repellent non-fluoropolymer may be a non-fluoropolymer disclosed in JP 2017-155095A. Such non-fluoropolymer may be, for example, an organomodified silicone represented by the following formula:

[Chem 6]

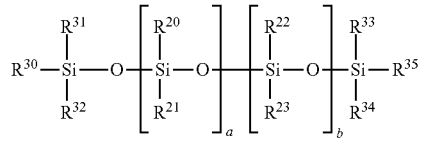

wherein $R^{20}$, $R^{21}$, and $R^{22}$ each independently represent a hydrogen atom, a methyl group, an ethyl group, or an alkoxy group having 1 to 4 carbon atoms, $R^{23}$ represents a hydrocarbon group having an aromatic ring and 8 to 40 carbon atoms or an alkyl group having 3 to 22 carbon atoms, $R^{30}$, $R^{31}$, $R^{32}$, $R^{33}$, $R^{34}$, and $R^{35}$ each independently represent a hydrogen atom, a methyl group, an ethyl group, an alkoxy group having 1 to 4 carbon atoms, a hydrocarbon group having an aromatic ring and 8 to 40 carbon atoms, or an alkyl group having 3 to 22 carbon atoms, a represents an integer of 0 or more, b represents an integer of 1 or more, and (a+b) is 10 to 200; when a is 2 or more, $R^{20}$ and $R^{21}$ in each occurrence may be the same or different, and when b is 2 or more, $R^{22}$ and $R^{23}$ in each occurrence may be the same or different.

In another embodiment, the repellent non-fluoropolymer may be a non-fluoropolymer disclosed in JP 2017-214680A, and particularly a dendritic polymer compound having a structure in which the polymer chains radiate in all directions and are regularly branched from the center. Such a dendritic polymer compound may be, for example, a compound obtained by reacting at least one isocyanate group-containing compound selected from an isocyanate, a diisocyanate, a polyisocyanate and a mixture thereof with at least one isocyanate reactive compound represented by any of the following formula:

[Chem 7]

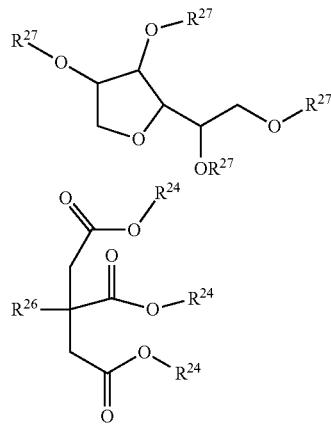

-continued

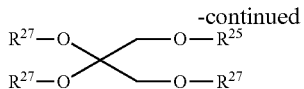

wherein $R^{27}$ each independently represent —H, $R^{28}$, —C(O)$R^{28}$, —(CH$_2$CH$_2$O)$_n$(CH(CH$_3$)CH$_2$O)$_m$$R^{29}$, or —(CH$_2$CH$_2$O)$_n$ (CH(CH$_3$)CH$_2$O)$_m$C(O)$R^{28}$, each n is independently 0 to 20, each m is independently 0 to 20, m+n is more than 0, $R^{28}$ each independently represent a linear or branched alkyl group having 5 to 29 carbon atoms and optionally having one or more unsaturated bonds, $R^{29}$ each independently represent —H, or a linear or branched alkyl group having 6 to 30 carbon atoms and optionally having one or more unsaturated bonds, $R^{26}$ represents —H, —$R^{28}$, —C(O)$R^{28}$, —(CH$_2$CH$_2$O (CH(CH$_8$)CH$_2$O)$_m$$R^{29}$, or —(CH$_2$CH$_2$O(CH(CH$_3$) CH$_2$OC(O)$R^{28}$, $R^{24}$ each independently represent —H, or a linear or branched alkyl group having 6 to 30 carbon atoms and optionally having one or more unsaturated bonds, (CH$_2$CH$_2$O)$_{n'}$(CH(CH$_3$)CH$_2$O)$_{m'}$$R^{29}$, or (CH$_2$CH$_2$O (CH(CH$_3$)CH$_2$OC(O)$R^{28}$, each n' is independently 0 to 20, each m' is independently 0 to 20, m+n is more than 0, $R^{25}$ represents —H, —C(O)$R^{28}$, or —CH$_2$C[CH$_2$O$R^{27}$]$_3$.

In another embodiment, the repellent non-fluoropolymer may be a non-fluoropolymer disclosed in JP 2017-222827A. Such a non-fluoropolymer may be, for example, a blocked isocyanate represented by the following formula:

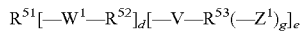

wherein d represents an integer of 2 or more, e represents an integer of 1 or more, (d+e) is 3 to 6, g represents an integer of 1 or more, $R^{51}$ represents an organic group having a valence of (d+e), $W^1$ represents a divalent group of an ester group, an amide group, a urethane group, or a urea group, $R^{52}$ represents a linear or branched monovalent hydrocarbon group having 10 to 24 carbon atoms, V represents a divalent group of a urethane group or a urea group, $R^{53}$ represents an organic group having a valence of (1+g), and $Z^1$ represents a monovalent group from an isocyanate group or a blocked isocyanate group.

In another embodiment, the repellent non-fluoropolymer may be a non-fluoropolymer disclosed in JP 2015-120894A. Such a non-fluoropolymer may be, for example, a non-fluoropolymer having (i) a repeating unit derived from a long chain (meth) acrylate ester monomer represented by the following formula:

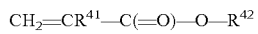

wherein $R^{41}$ is a hydrogen atom or a methyl group, and $R^{42}$ is a linear or branched aliphatic hydrocarbon group having 18 to 30 carbon atoms, and (ii) a repeating unit derived from a (meth)acrylate monomer having a cyclic hydrocarbon group.

The above-described solvent may be, for example, water or a non-aqueous solvent, such as a fluorine-free organic solvent or a fluorine-containing organic solvent, and preferably water.

The above-described surfactant may be, for example, a nonionic surfactant, a cationic surfactant, an anionic surfactant, or an amphoteric surfactant.

In one embodiment, the repellent may include another additive in addition to the above-described components. Examples of the additive include a cross-linking agent (e.g., a blocked isocyanate), an insect repellent, an antibacterial agent, a softening agent, an antifungal agent, a flame retarder, an antistatic agent, an antifoaming agent, a fixing agent for coating, a penetrant, an organic solvent, a catalyst, a pH adjuster, and a wrinkle-resistant agent.

(Substrate)

The substrate to be treated is typically a fiber product, and particularly fabric. The fabric includes a textile, a knit, and nonwoven fabric, a fabric in the form of clothing, and a carpet, and may also be fiber or yarn or an intermediate of fiber product (e.g., sliver or roving). The material for the fiber product may be a natural fiber (e.g., cotton or wool), a chemical fiber (e.g., viscose rayon or leocell), or a synthetic fiber (e.g., polyester, polyamide or an acrylic fiber), or alternatively, may be a mixture of fibers (e.g., a mixture of a natural fiber and a synthetic fiber).

(Treatment Method)

"Treatment" means applying a treatment agent (repellent in the present disclosure) to an object to be treated (substrate in the present disclosure) by, for example, immersing, spraying, or coating. Through the treatment, the active component of the treatment agent (repellent polymer in the present disclosure) penetrates inside of the object to be treated and/or is attached to the surface of the object to be treated. The "treatment" also encompasses kneading (e.g., melt kneading) an object to be treated or the material thereof with the treatment agent to thereby incorporate the treatment agent into the object to be treated.

The repellent can be applied to the substrate by any known method for treating a substrate such as a fiber product, with a liquid. In the case where the substrate is a fabric, the fabric may be immersed in a liquid, or a liquid may be attached to or sprayed on the fabric. In order to develop water-repellency and/or oil-repellency, the treated substrate is dried and preferably heated at, for example, 100° C. to 200° C.

In the case where it is intended to obtain a treated nonwoven fabric, a thermoplastic resin and a repellent can be kneaded (e.g., melt kneaded) to thereby obtain a resin composition, and the composition can be heated and spun to thereby obtain a treated nonwoven fabric. Generally, a thermoplastic resin and a repellent are heated to a temperature of 100 to 320° C., for example 200 to 300° C., and kneaded, and then a nonwoven fabric is produced.

(Evaluation)

As described hereinabove, the evaluation is performed by, for example, comparing the state of a spot and a water drop remaining on the substrate after spraying water with predetermined criteria including a relation between images and evaluation values as shown in FIG. 1. The evaluation values shown in FIG. 1 are determined by the spray test method in accordance with AATCC-22 (JIS-L-1092, ISO4920). As shown in the table below, the evaluation value is indicated by the water-repellency No. A larger value means better water-repellency, and an intermediate value (95, 85, 75) is given depending on the state.

TABLE 1

| No. (Evaluation value) | State |
|---|---|
| 100 | There is no wet or water drop adhered on the surface. |
| 90 | There are small water drops adhered on the surface, but the surface is not wet. |
| 80 | There is wet on each small water drops on the surface. |
| 70 | Wet occupies half of the surface, and each small wet penetrates the fabric. |
| 50 | Wet occupies the whole of the surface. |
| 0 | Wet occupies the whole of the surface and the whole of the back surface. |

Water-repellency

At this time, it cannot be said that a conventional method, in which an operator visually compares the state of the substrate after spraying water with the images of the criteria, is quantitative. In contrast, the spot evaluation method, the water drop evaluation method, the repellent evaluation method, and the repellent evaluation device according to the present disclosure enable quantitative determination for a result of the evaluation.

In evaluation of the repellent, the element, such as a "spot" and a "water drop" generated on the substrate that has been treated with the repellent, is considered. Here, image data on the substrate that has been treated with the repellent include a lot of elements that unrelated to the repellent, in addition to the spot and the water drop. Examples of the elements included in the image data and unrelated to the repellent include a "wrinkle" generated on the substrate, and "properties of the substrate" such as the texture including the color of the fiber for the substrate and the roughness of the weave. When automatic processing is performed on image data including these, it is necessary to distinguish elements related to the performance of the repellent and elements unrelated to the performance of the repellent. In the spot evaluation method, the water drop evaluation method, the repellent evaluation method, and the repellent evaluation device according to the present disclosure, elements unrelated to the performance of the repellent are eliminated from the image data before evaluation.

Embodiment 1

A device 1A for evaluating a repellent according to Embodiment 1 will be described with reference to FIGS. 2 to 9.
<Repellent Evaluation Device>

Figure 2:
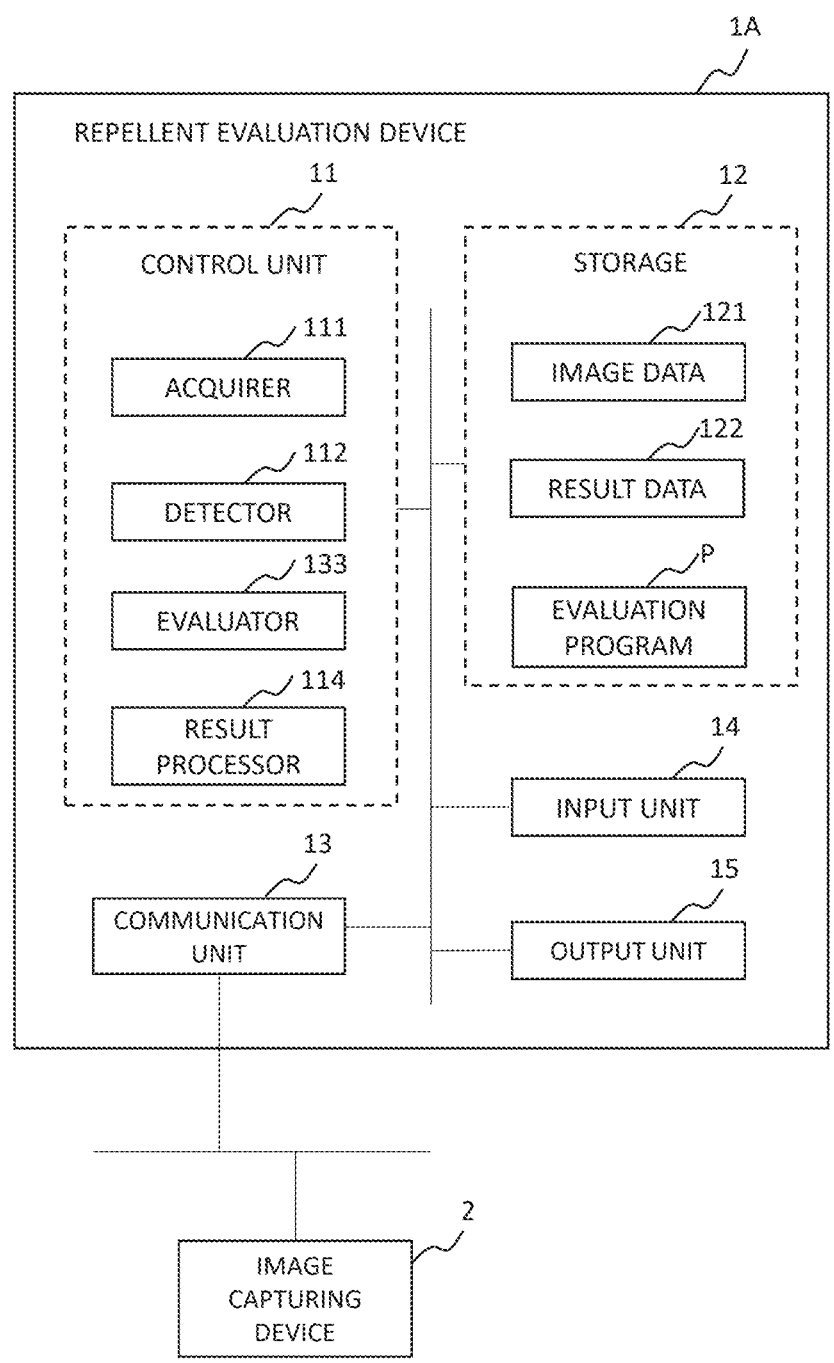
FIG. 2 is a block diagram showing a repellent evaluation device according to Embodiment 1.

As shown in FIG. 2, repellent evaluation device 1A is an information processing device including a control unit 11, a storage 12, and a communication unit 13. The control unit 11 is a controller that conducts the control of the whole of the repellent evaluation device 1A. For example, the control unit 11 reads and runs an evaluation program P, stored in the storage 12 to perform processing by an acquire 111, a detector 112, an evaluator 113, and a result processor 114. The control unit 11 is not limited to those that perform a predetermined function by cooperation of hardware and software, and may be hardware circuitry that is designed exclusively for performing the predetermined function. Specifically, the control unit 11 may include any of various processors such as CPU, MPU, GPU, FPGA, DSP, and ASIC.

The storage 12 is a storage medium that stores various information. The storage 12 includes, for example, RAM, ROM, flash memory, SSD (Solid State Device), hard disk, another storage device, or an appropriate combination thereof. In the storage 12, various data used for learning and prediction, for example, is stored in addition to program P for evaluation which is run by the control unit 11. For example, image data 121, result data 122, and the evaluation program P are stored in the storage 12.

The communication unit 13 is an interface circuitry (module) for enabling data communication with an external device (not shown). For example, the communication unit 13 may perform data communication with an image capturing device 2 that captures an image to obtain image data.

The repellent evaluation device 1A can include an input unit 14 and an output unit 15. The input unit 14 is input devices to input manipulation signal and/or data, such as an operation button, a mouse, and a keyboard. Output unit 15 is output devices to, for example, output a result of processing and/or data, such as a display.

The repellent evaluation device 1A may include a single computer or may include a combination of a plurality of computers connected to each other via a network. For example, the repellent evaluation device 1A may be configured in the following manner (not shown): the whole or part of data stored in the storage 12 is stored in an outer recording medium connected via a network, and the repellent evaluation device 1A uses the data stored in the outer recording medium.

The acquire 111 acquires the image data 121 including data on the substrate that has been treated with the repellent to be evaluated. The acquirer 111 stores acquired image data 121 in the storage 12. For example, acquire 111 is connected to the image capturing device 2, sends a signal of operation to capture an image to the image capturing device 2, and acquires the image data captured by the image capturing device 2.

The detector 112 performs processing on the image data 121 acquired by the acquire 111 by a method depending on the type of the image, i.e., a "wrinkle image," a "spot image," or a "water drop image" and detects a region of a spot or a region of a water drop, the method of processing being predetermined according to the type of the image.

Among the image data 121, the "wrinkle image" is data including data on a substrate including a wrinkle. Among the image data 121, the "spot image" is data including data on a substrate including a spot without any wrinkle. Among the image data 121, the "water drop image" is data including data on a substrate including a water drop without any wrinkle or spot.

In a case where the image data 121 is a "wrinkle image," it is determined whether or not this image data 121 includes data on a spot, and if the image data 121 includes no data on a spot, the image data 121 is determined as a "water drop image" and processed by the second image processing, which will be described later. If the image data 121 includes data on a spot, the image data 121 is excepted from objects to be evaluated using the repellent evaluation device 1A, and regarded as an object to be evaluated by an operator.

In a case where the image data 121 is a "spot image," the detector 112 performs "the first image processing," which is for a spot image. Specifically, the detector 112 eliminates the influence of the unevenness of the brightness and the texture of the substrate from the image data 121 by the first image processing. The first image processing will be described in detail later. The detector 112 detects a region of a spot from the image data 121 that has applied the first image processing.

In a case where the image data 121 is a "water drop image," the detector 112 performs "the second image processing," which is for a water drop image. Specifically, the detector 112 eliminates the influence of wrinkles from the image data 121 and highlights the region of a water drop by the second image processing. The second image processing will be described in detail later. The detector 112 detects a region of a water drop from the image data 121 that has applied the second image processing.

For example, when the acquire 111 acquires the image data 121, the type of the image data 121 is acquired together with the image data 121 and in connection with image data 121. Alternatively, at the timing of the evaluation of the repellent, the output unit 15 may display so that an operator may select the type through the input unit 14. A specific value obtained by image processing or others may also be utilized.

In a case where the detector 112 detects a region of a spot from the image data 121 that applied the first image processing, the evaluator 113 determines the evaluation value from the area ratio of the region of a spot on the substrate to evaluate the spot.

In a case where the detector 112 detects a region of a water drop from the image data 121 that applied the second image processing, the evaluator 113 determines the evaluation value from the number of the regions of a water drop to evaluate the water drop. The evaluator 113 may evaluate from the number of water drops per unit area, instead of just the number of the water drops.

The result processor 114 stores the evaluation value determined as a the result data 122 in connection to the image data 121 in the storage 12. The result processor 114 may output the evaluation value to the output unit 15.

As an object to be evaluated by an operator, the result processor 114 records, in the storage 12, the image data 121 that has been excepted from objects to be evaluated using the repellent evaluation device 1A during preceding processing. The image data 121 that has been excepted from objects to be evaluated may be the image data 121 including data on both a wrinkle and a spot, for example. Also, in a case where the result of detection in the detector 112 meets a predetermined requirement, the case may be excepted from objects to be evaluated and be recorded as occurrence of an error. In a case where evaluation cannot be performed by the repellent evaluation device 1A, a lack of evaluation is prevented by evaluating later, by an operator, the image data 121 stored as an object to be evaluated by an operator in the storage 12.

<<First Image Processing: Spot Image>>

Figure 3A:
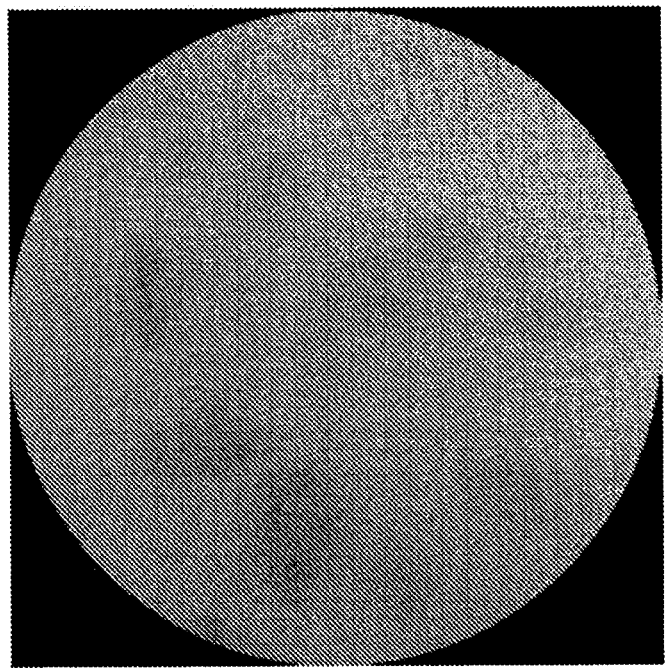
FIG. 3A is an example of image data on a substrate including a spot.
Figure 3B:
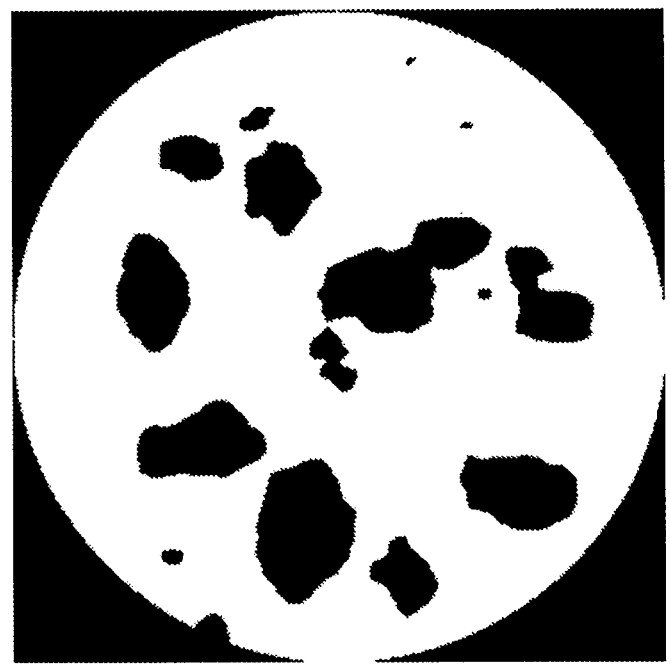
FIG. 3B is data obtained by binarizing the image data in FIG. 3A.

The first image processing will be described with reference to FIG. 3A to FIG. 6D. FIG. 3A is an example of image data including data on a substrate treated with a repellent. Specifically, FIG. 3A is an example of a trimmed image obtained by converting image data 121 acquired by the acquire 111 into a grayscale image, then extracting the substrate portion, and blacking the background. When water is sprayed on a substrate treated with a repellent, a spot may generate on the substrate as in the image shown in FIG. 3A. FIG. 3B is image data obtained by binarizing the image data in FIG. 3A. The image data in FIG. 3B is of a case where a region of a spot generated on the substrate is detected. Specifically, the black portion is a region of a spot. However, a region of a spot is not always detected on image data, though detected in FIG. 3B.

Figure 4A:
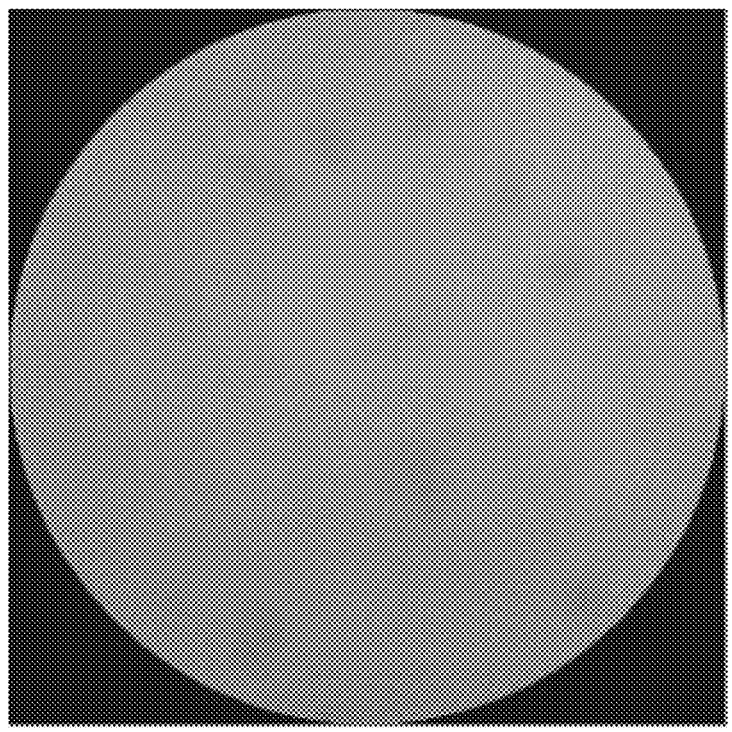
FIG. 4A is another example of image data on a substrate including a spot.
Figure 4B:
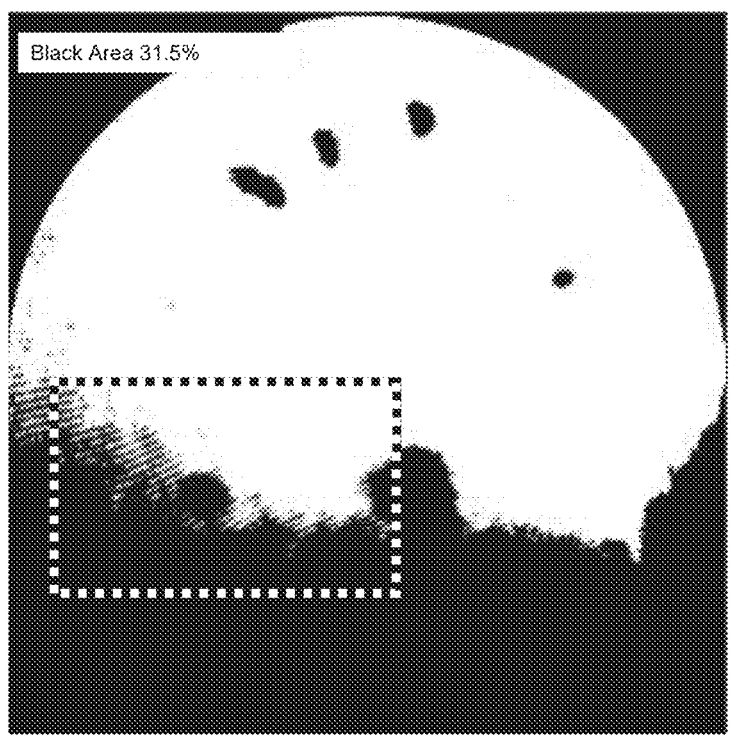
FIG. 4B is data obtained by binarizing the image data in FIG. 4A.
Figure 4C:
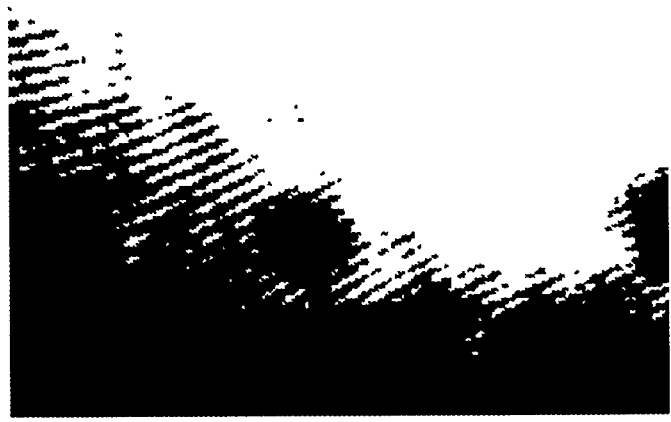
FIG. 4C is an enlarged view of the region enclosed by the dotted line in the image data in FIG. 4B.

FIG. 4A is another example of image data including data on a substrate treated with a repellent. FIG. 4A shows a trimmed image obtained by performing the same processing as in FIG. 3A. FIG. 4B is image data obtained by binarizing the image data in FIG. 4A. Although it is difficult to see in the image data in FIG. 4A, the brightness is lower in the lower part of the image than in the upper part thereof. Accordingly, in the image data after binarization shown in FIG. 4B, the lower part of the substrate is blackish and the region of a spot is not detected precisely. FIG. 4C shows the rectangular region enclosed by the dotted line in the image data in FIG. 4B. As shown in FIG. 4C, it can be seen that the texture of fibers as the substrate is shown up in the image data after binarization.

Figure 5:
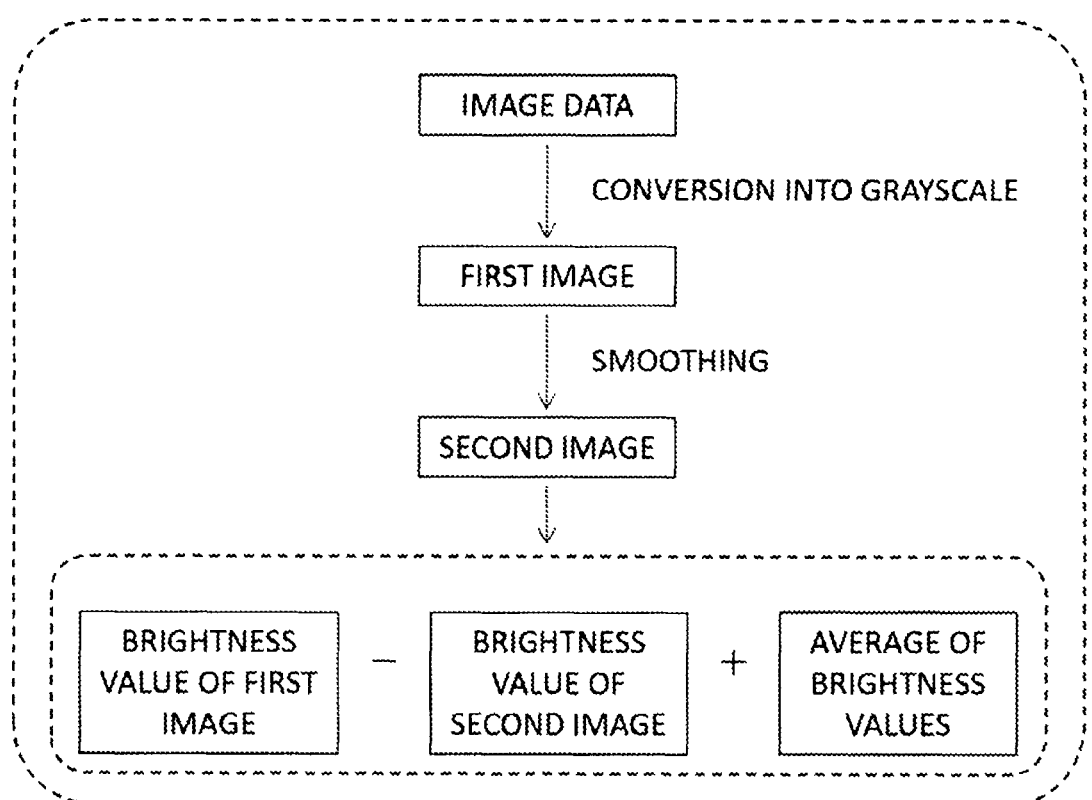
FIG. 5 is a schematic diagram for illustrating the first image processing.
Figure 6A:
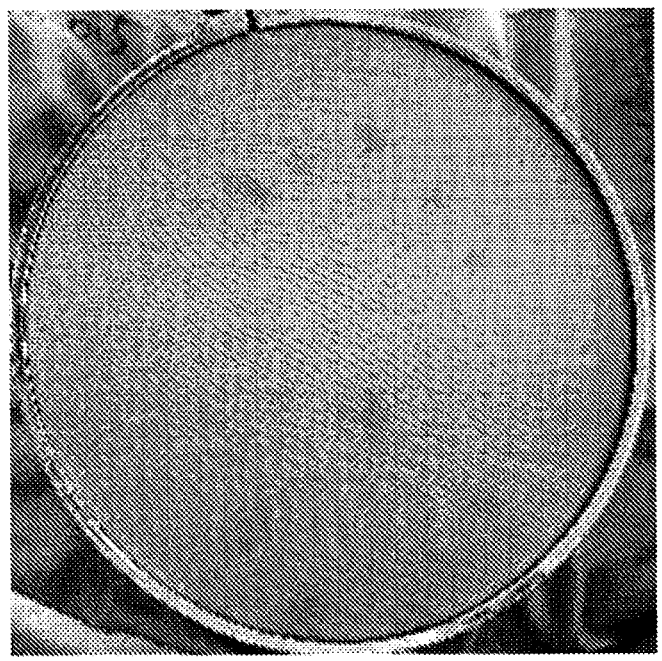
FIG. 6A is a grayscale image of a substrate including a spot.

The first image processing is processing for reducing the influence of the unevenness of the brightness and the texture of fibers as shown in FIG. 4B and FIG. 4C to enable detection of a region of a spot. Specifically, in a case where the image data 121 is not in grayscale, the image data 121 is first converted into a grayscale image, which is created as the first image, as shown in FIG. 5. In a case where image data 121 is acquired in grayscale, the image data 121 acquired is regarded as the first image. FIG. 6A shows an example of the first image. In the figures shown as examples in the present disclosure, the image data 121 acquired by acquire 111 is shown as a grayscale image; however, the image data 121 may actually be a color image.

Figure 6B:
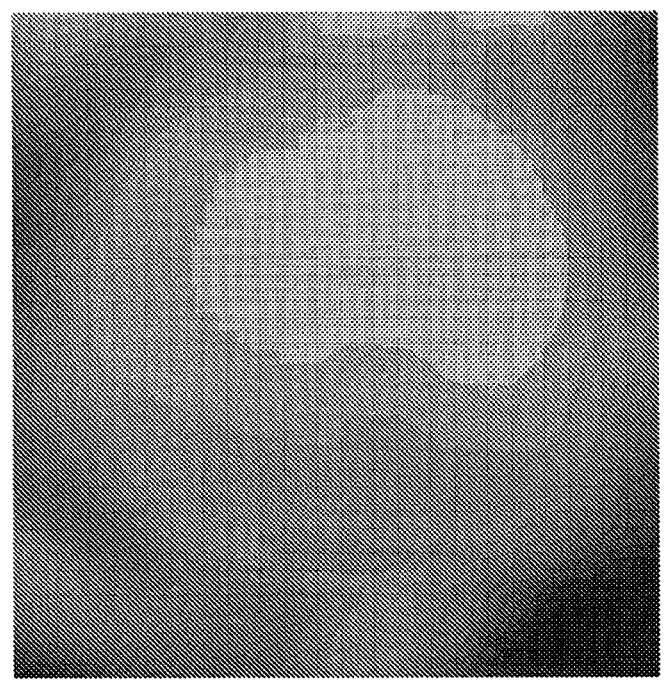
FIG. 6B is an image obtained by smoothing the image data in FIG. 6A.

As shown in FIG. 5, the detector 112 also performs smoothing on the first image to create the second image. FIG. 6B is an example of the second image which is obtained from the image of FIG. 6A. The second image is an airbrushed image of the first image. Specifically, for smoothing, the detector 112 may use a Gaussian filter, which gives much weight to the center portion, for example. Alternatively, smoothing algorithms, such as averaging, median filter, and bilateral filter, may be used.

Figure 6C:
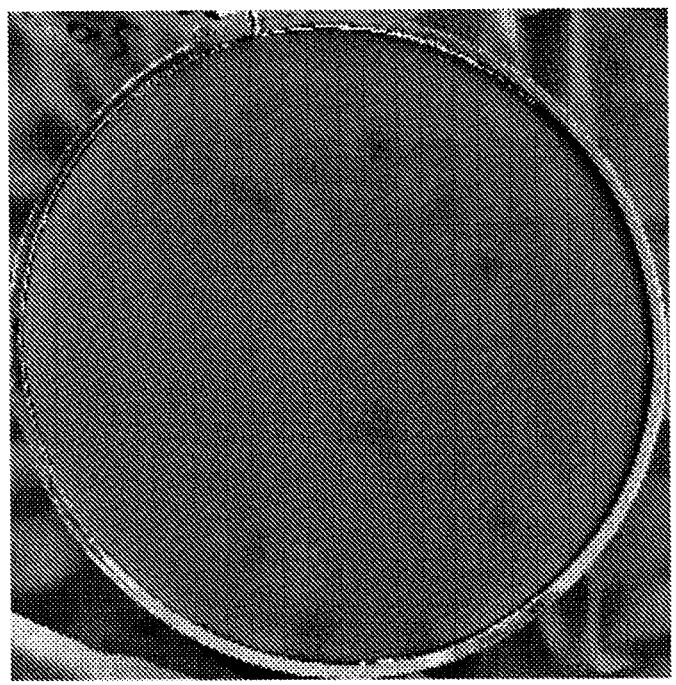
FIG. 6C is an image obtained by performing the first image processing on the image data in FIG. 6B.
Figure 6D:
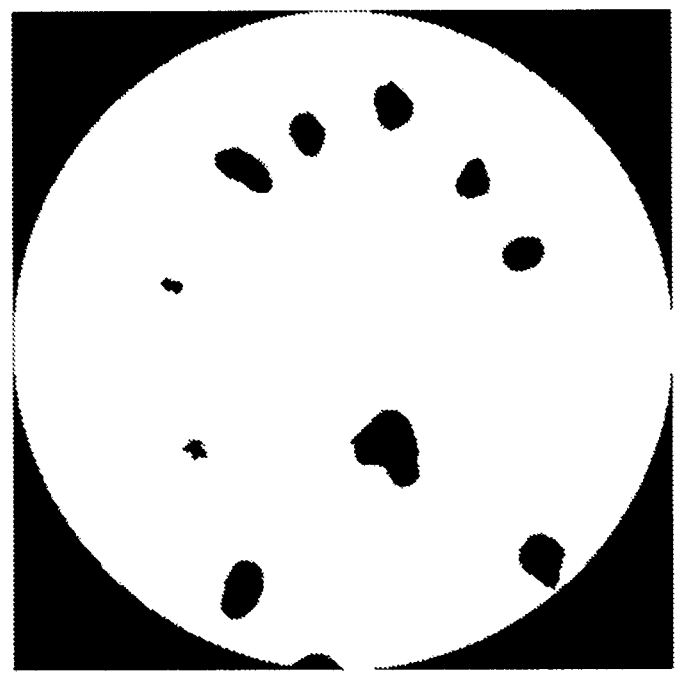
FIG. 6D is data obtained by binarizing the image data in FIG. 6C.

Thereafter, for each image pixel in the whole image, the detector 112 subtracts the brightness value of the second image from that of the first image and adds the average of the brightness values as shown in FIG. 5 and the following expression (1), and the resulting image data is used as the result of the first image processing. FIG. 6C shows an example of image obtained as the result of the first image processing.

$$I_{ij}=L_{ij}-M_{ij}+N \quad (1)$$

i: x-coordinate of image
j: y-coordinate of image
$I_{ij}$: brightness value of image that has applied first image processing
$L_{ij}$: brightness value of first image at ij coordinates
$M_{ij}$: brightness value of second image at ij coordinates
N: average of brightness values of first image By utilizing the image data obtained by the first image processing, a region of a spot can be precisely detected without any influence of the unevenness of the brightness or the texture of the substrate. Specifically, FIG. 6D is an example of image data obtained by extracting the substrate portion from the image data of FIG. 6C, followed by trimming, and then binarizing the resultant. As compared FIG. 6D with FIG. 4B, it can be seen that the influence of the unevenness of the brightness and the texture of the substrate can be eliminated.

<<Second Image Processing: Water Drop Image>>

Figure 7A:
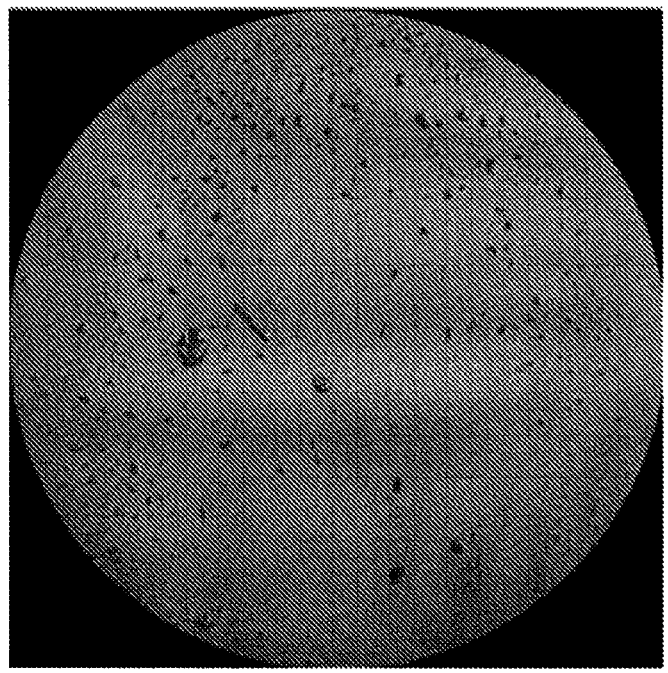
FIG. 7A is an example of image data on a substrate including a water drop.
Figure 7B:
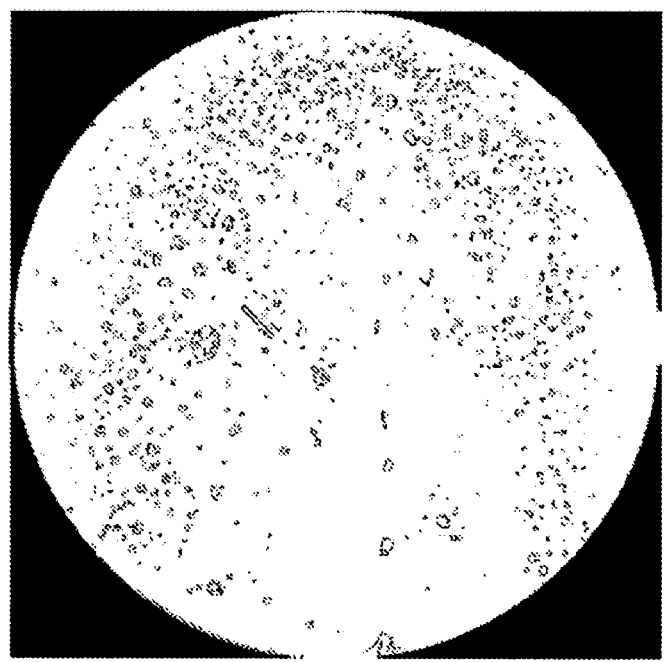
FIG. 7B is an image obtained by performing the second image processing on the image data in FIG. 7A.

The second image processing will be described with reference to FIGS. 7A and 7B. FIG. 7A is an example of image data including data on a substrate treated with a repellent. Specifically, FIG. 7A is a trimmed image obtained by extracting the substrate portion from the image data 121 acquired. The second image processing is detection of an edge on the basis of the brightness gradient of an image to detect a region of a water drop from such image data. Specifically, as the second image processing, the detector 112 determines whether or not the difference between the brightness values of adjacent image pixels is the predetermined value or more, and creates a binarized image in which an image pixel with the predetermined value or more and that with less than the predetermined value are converted to black and white, respectively. FIG. 7B is an example of image data obtained by the above second image processing from the image data in FIG. 7A.

Figure 7C:
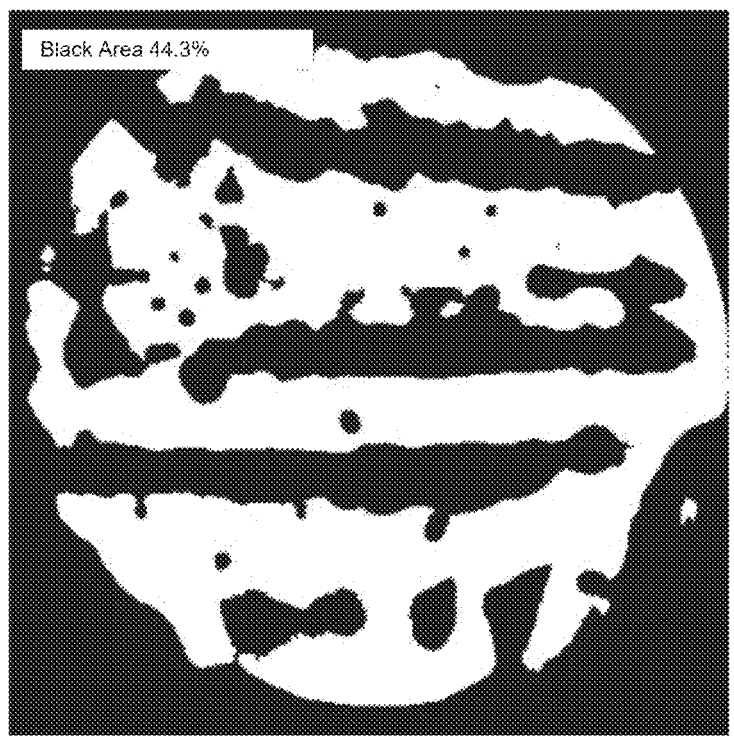
FIG. 7C is data obtained by binarizing the image data in FIG. 7B.

As in the image shown in FIG. 7A, a wrinkle may be generated in the substrate. Such a wrinkle portion generated may not be distinguished from a spot when the first image processing is performed to detect a spot. FIG. 7C is an example of binarizing the image of FIG. 7A for the purpose of detection of a spot. As shown in FIG. 7C, a wrinkle is detected as with a spot, and thus a spot may not be detected precisely. On contrast, the image data obtained by the second image processing is not affected by a wrinkle. Accordingly, even if a wrinkle is generated in the substrate, an image as shown in FIG. 7B can be obtained.

<Processing for Evaluation of Repellent>

Figure 8:
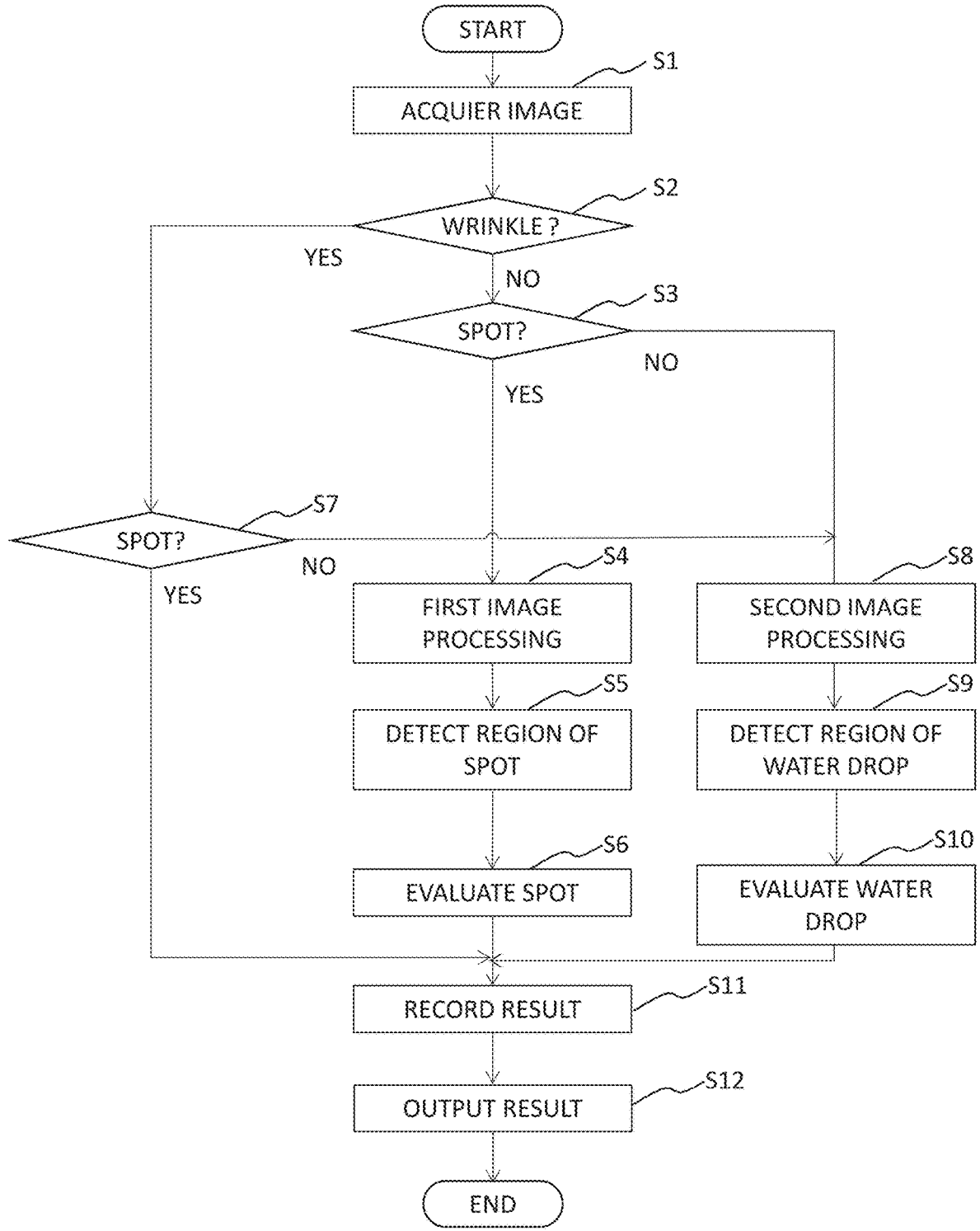
FIG. 8 is a flowchart illustrating the processing in the repellent evaluation device in FIG. 2.

Processing for evaluation of repellent in device 1A for evaluating a repellent will be described with reference to a flowchart shown in FIG. 8. First, the acquire 111 acquires the image data 121 including data on a substrate that has been treated with a repellent to be evaluated (S1). For example, the acquire 111 makes image capturing device 2 connected thereto acquire image data on a substrate that has been treated with a repellent to be evaluated and sprayed with water. The acquire 111 also stores the acquired image data 121 in the storage 12.

Then, the detector 112 determines whether or not the image data 121 detected includes data on a wrinkle (S2). If no data on a wrinkle is included (if NO in S2), the detector 112 next determines whether or not the image data 121 includes data on a spot (S3).

If data on a spot is included (if YES in S3), the detector 112 performs the above-described first image processing on the image data 121 using expression (1) (S4).

The detector 112 detects a region of a spot from the image data 121 that has applied the first image processing in step S4 (S5). Specifically, the detector 112 performs binarization on image data 121 that has applied the first image processing and detects a region of a spot from the resulting binarized data. For example, in a case where the binarized image data is the example shown in FIG. 6D, the detector 112 detects the black regions as regions of spots. In binarization, the detector 112 sets a threshold value by a predetermined method, and each image pixel of the image data 121 that has applied the first image processing is converted to white when the brightness value thereof is the threshold value or more, and is converted to black when the brightness value thereof is less than the threshold value. For example, the detector 112 can set a threshold value using a histogram of the image data 121 that has applied the first image processing.

The evaluator 113 determines an evaluation value on the basis of the area ratio of the region of a spot in the substrate detected in step S5 (S6). Specifically, if a repellent is at a high performance level, any spot is unlikely to generate when water is sprayed on a substrate that has treated with the repellent, since the repellent repels water. On the other hand, if a repellent is at a low performance level, a spot is easy to generate since it is difficult for the repellent to repel water. Accordingly, the performance of the repellent can be evaluated on the basis of the ratio between the area of the substrate and the area of the spot. Specifically, when the ratio of the area of the spot to the area of the substrate is small, the performance of the repellent is at a high level, and adversely, when the ratio of the area of the spot to the area of the substrate is large, the performance of the repellent is at a low level. For example, the evaluator 113 can be set beforehand so as to access a mathematical expression or table expressing the relation between such an area ratio and an evaluation value, and can thus determine the evaluation value of a spot according to this relation. Since the evaluator 113 determines an evaluation value using such evaluation criteria, a stricter evaluation value can be quantitatively determined compared to a case where an evaluator evaluates.

If the image data 121 includes data on a wrinkle, the detector 112 determines whether or not this image data 121 including data on a wrinkle (if YES in S2) further includes data on a spot (S5).

If the image data 121 includes no data on a spot (if NO in S3, or if NO in S7), the detector 112 regards this image data 121 as an object for detecting a water drop, and performs the second image processing on the image data 121 (S8).

Figure 9:
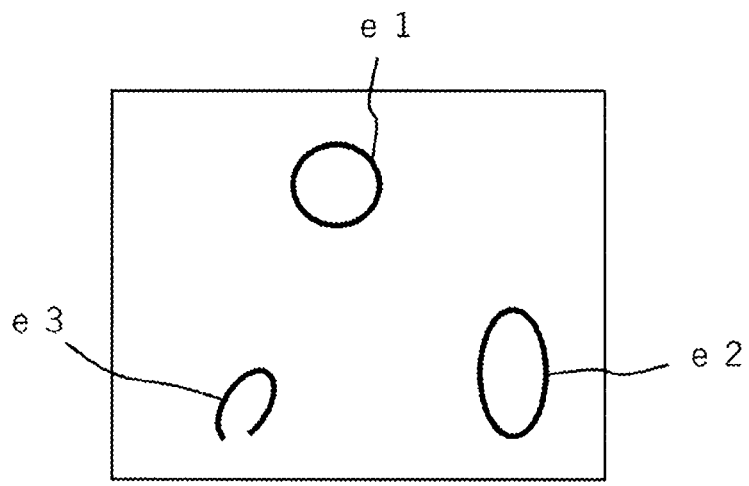
FIG. 9 is a view illustrating extraction of a water drop.

The detector 112 detects a region of a water drop from the image data 121 that has applied the second image processing in step S8 (S9). For example, the detector 112 detects a closed region formed in the image data 121 as a region of a water drop. An edge portion other than the closed region is also extracted as a region of a water drop. Extraction of a water drop will be described with reference to FIG. 9. FIG. 9 is an example of the image data 121 that has applied the second image processing. In the example in FIG. 9, edges e1 and e2 each form a closed region, and the detector 112 thus detects these as a region of a water drop. Edge e3 does not form a closed region, but the detector 112 also detects such an edge as a region of a water drop. Accordingly, the number of water drops is three in the example shown in FIG. 9.

The evaluator 113 determines the evaluation value on the basis of the number of the regions of water drops detected in step S9 (S10). Specifically, if a repellent is at a high performance level, any water drop is unlikely to generate when water is sprayed on a substrate that has treated with the repellent, since the repellent repels water. On the other hand, if a repellent is at a low performance level, a water drop is easy to generate since it is difficult for the repellent to repel water. Accordingly, the performance of the repellent can be evaluated on the basis of the number of the water drops included in the substrate. Specifically, when the number of water drops is small, the performance of the repellent is at a high level. Adversely, when the number of water drops is large, the performance of the repellent is at a low level. For example, the evaluator 113 can be set beforehand so as to access a mathematical expression or table expressing the relation between the number of water drops and an evaluation value, and can determine the evaluation value of the water drop according to this relation. At this time, the number of water drops generating on the substrate treated with a repellent varies depending on the area of the substrate even if the same repellent is used. Accordingly, it is necessary to set the relation between the number of water drops and the evaluation value, which is used by the evaluator 113, according to the area of the substrate included in image data 121. Since the evaluator 113 determines an evaluation value using such evaluation criteria, a stricter evaluation value can be quantitatively determined compared to a case where an evaluator evaluates.

The result processor 114 records the evaluation value determined in step S6 or S10 as the result data 122 in the storage 12 (S11). At this time, the result processor 114 may store, in the storage 12, various image data obtained in the course of the first image processing in step S5 and the image data obtained in the second image processing in connection with the original image data 121. The result processor 114 may also store various data relating to the image data 121 in connection with the image data 121.

The result processor 114 also outputs the result including the evaluation value determined to the output unit 15 (S12). When a repellent is evaluated using a plurality of the image data 121, a plurality of evaluation values may be determined and then the results may be output all at once.

From the image data 121 including data on a wrinkle and a spot (if YES in S7), a region of a spot cannot be extracted precisely due to the influence of the wrinkle as described above with reference to FIG. 7C, and such image data is thus recorded as image data excepted from objects to be evaluated. For example, such image data 121 is regarded as an object to be evaluated by an operator. In this case, part of the image data 121 is excepted from objects to be evaluated by the repellent evaluation device 1A and is regarded as an object to be evaluated by an operator. However, most of the whole is an object to be evaluated by the repellent evaluation device 1A. Accordingly, most can be evaluated quantitatively. According to a result of an experiment, 90% or more of the whole image data acquired by the acquire 111 was the object to be evaluated by the repellent evaluation device 1A.

In the above described manner, predetermined image processing is performed according the type of the image in the repellent evaluation device 1A, whereby any influence that is included in image data but is not relevant to the performance of the repellent is eliminated, and thus the repellent evaluation device 1A enables quantitative evaluation of performance of a repellent based on numerical calculation of, for example, the area ratio of a spot or the number of water drops. For example, although various colors and materials may be used for a substrate, quantitative evaluation of performance can be made by utilizing the above described processing.

Embodiment 2

A repellent evaluation device 1B according to Embodiment 2 will be described with reference to FIG. 10A to 14. The repellent evaluation device 1B according to Embodiment 2 classifies and evaluates image data using a learned model created by machine learning.

"Machine learning" is a method including learning characteristics included in a plurality of input data and creating a "model" for predicting a result corresponding to new input data. Specifically, machine learning is performed by a "learner". A model created in such a way is referred to as a "learned model" or "learning model".

Figure 10A:
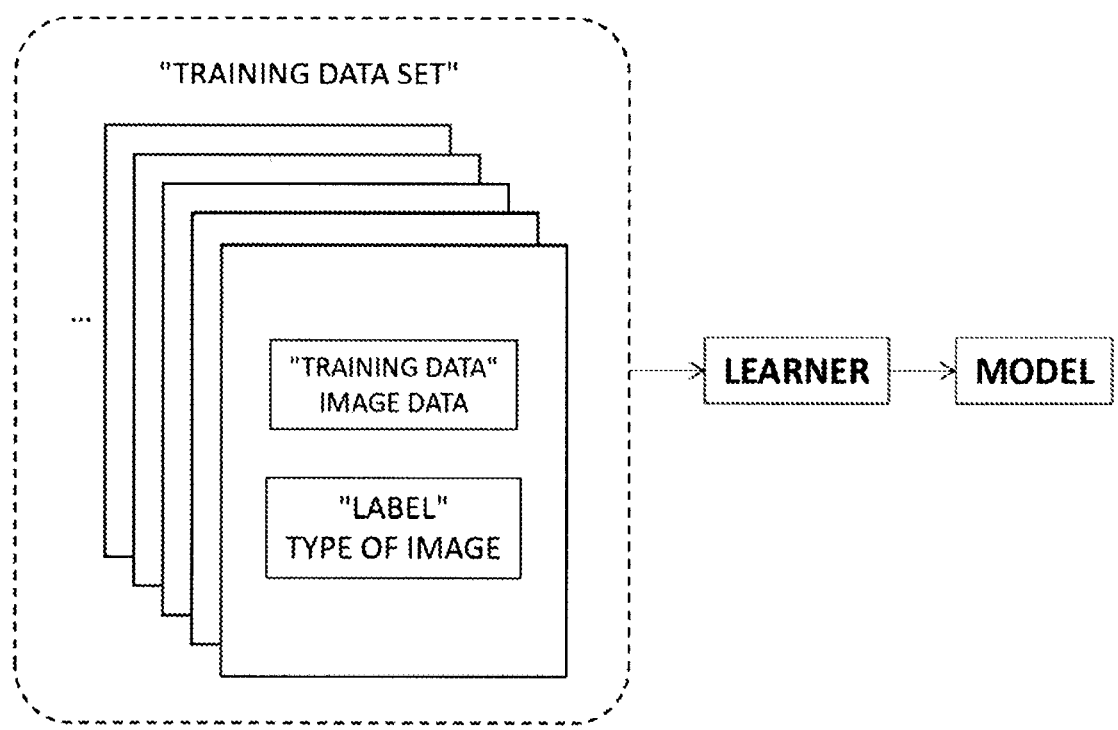
FIG. 10A is a schematic diagram illustrating creation of a learned model.
Figure 10B:
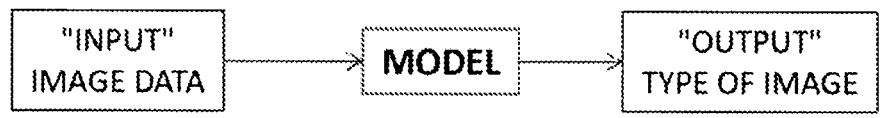
FIG. 10B is a schematic diagram illustrating utilization of a learned model.

As shown in FIG. 10A, when a plurality of pairs of training data are input, the "learner" learns the relation between the input training data and creates a learned "model", which expresses the relation in terms of a parameter. By utilizing a learned model created, an "output" needed can be obtained from a new "input", as shown in FIG. 10B. Machine leaning includes, for example, supervised learning, unsupervised learning, and reinforcement learning, and the present embodiment will be described for a case where supervised learning is utilized. Accordingly, a case of supervised learning in which a "label", i.e., correct answer is connected to each corresponding "training data" is shown in FIG. 10A. The learner can utilize, as machine learning, neural network (NN), support vector machine (SVM), decision tree, or gradient boosting, for example. The learner may utilize combinations of these methods.

Figure 11:
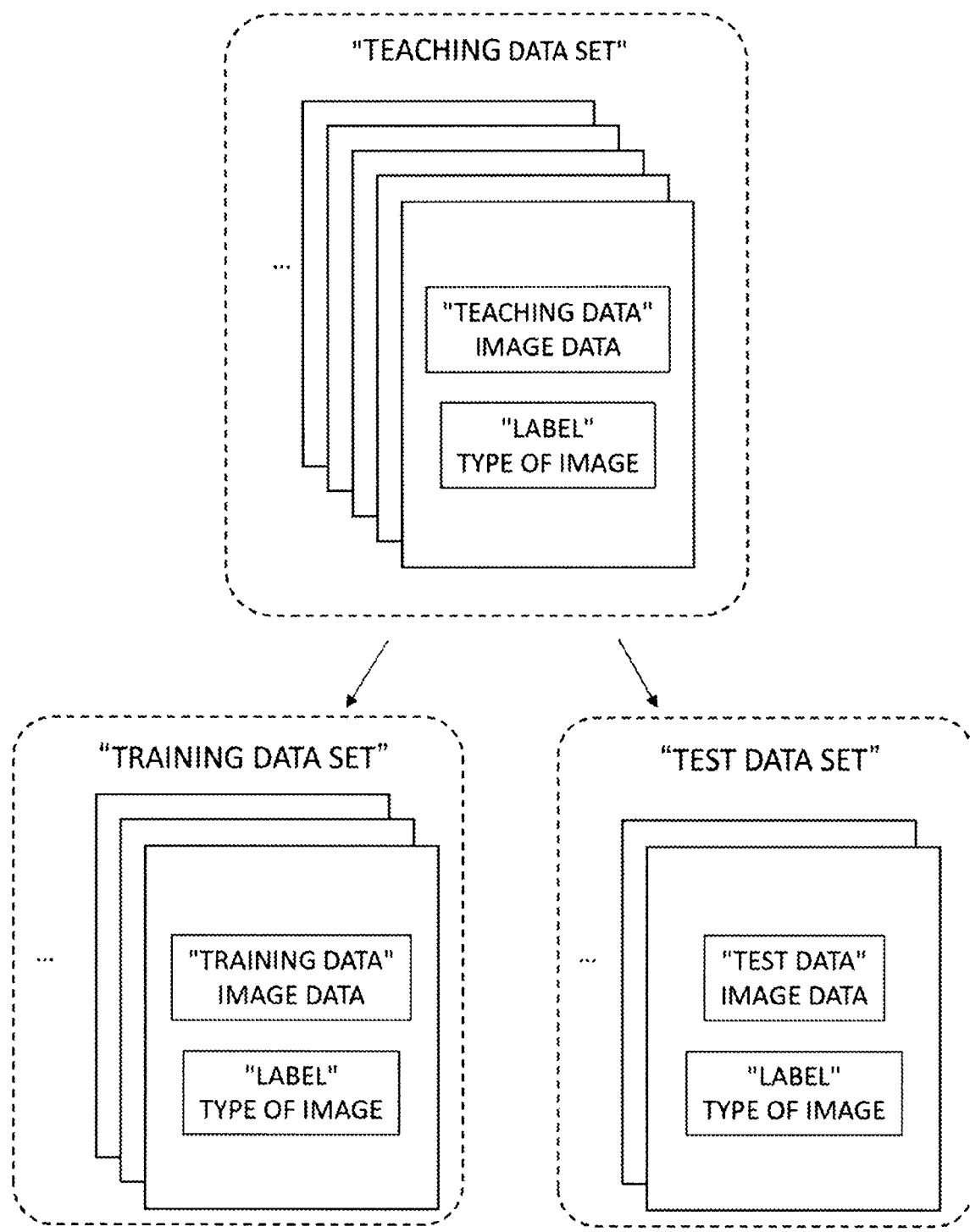
FIG. 11 is a schematic diagram illustrating training data, which is utilized for creating a learned model.

"Training data" here is data to be utilized for machine learning. For example, in supervised learning, "training data" is paired with a "label" that is the correct answer corresponding to the training data, and the pair is input into a learner. More specifically, in machine learning, a "data set" including a plurality of pairs of "teaching data" and a "label" is utilized for creating a learning model, as shown in FIG. 11. At this time, of this data set, which is a "teaching data set", some are used as a data set for learning, and the remains are used as a data set for verification of learning, which is for evaluation. Here, the "teaching data" of the data set for learning is "training data" and "teaching data" of the data set for verification of learning is "test data".

<Repellent Evaluation Device>

Figure 12:
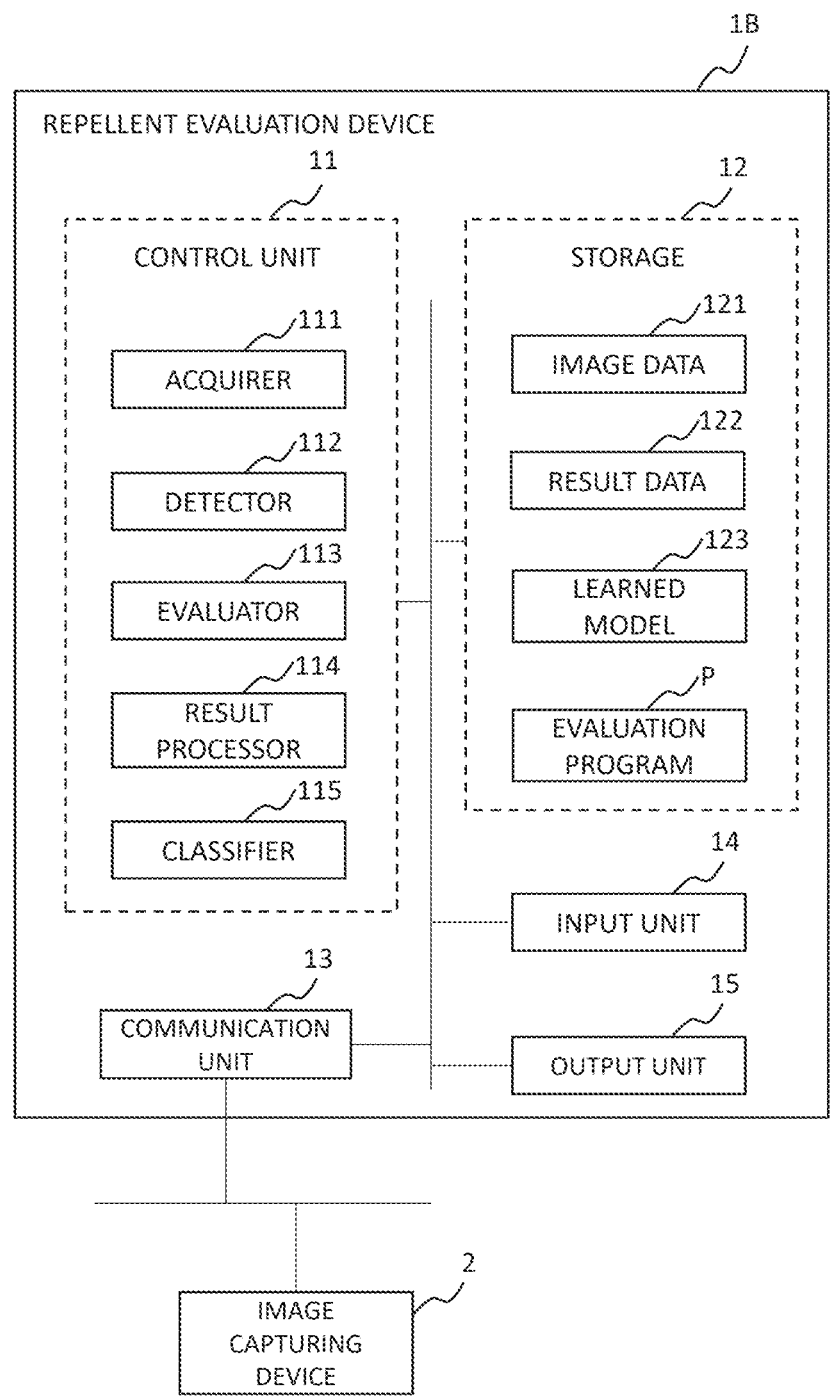
FIG. 12 is a block diagram showing a repellent evaluation device according to Embodiment 2.

As shown in FIG. 12, the repellent evaluation device 1B is different from the repellent evaluation device 1A shown in FIG. 2 in that control unit 11 includes a classifier 115 and that learned model 123 is stored in the storage 12. The repellent evaluation device 1B classifies image data 121 according to type by the classifier 115, and utilizes it for evaluation of a repellent.

The classifier 115 classifies the image data 121 according to type using the learned model 123 which has learned by machine learning. Specifically, the classifier 115 determines values respectively representing possibilities of corresponding to the class of a "wrinkle image," a "spot image," and a "water drop image". The classifier 115 selects the type of the class with the highest value as the type of the image data 121 of question. In the repellent evaluation device 1B, operation from classification of the image data 121 to evaluation can be an object to be evaluated by the repellent evaluation device 1B, by using the learned model 123 without classifying operation on the image data 121 by an operator.

This learned model 123 is created by learning the relation between a plurality of image data including data on a substrate treated with a repellent and sprayed with water and the types of the image data that have been selected for each image data in advance. The type of image data is any of a "wrinkle image," a "spot image," or a "water drop image," as described above.

<<Learning in the Classifier 115>>

The classifier 115 creates the learned model 123 using a learner. Specifically, a learner can determine a feature parameter by deep learning using training data, to thereby create the learned model 123. The classifier 115 described here includes a learner therein, but is not limited thereto. For example, the learner may be present outside the repellent evaluation device 1B. In a case where the learner is present outside the repellent evaluation device 1B, the classifier 115 utilizes the learned model 123 that is created by the outside learner and stored in the storage 12.

Specifically, the "training data" used for machine learning by the classifier 115 is image data including data on a substrate that has been treated with a repellent and sprayed with water, as described above for FIG. 11. In this machine learning, a "label" as a correct answer is the "type of image data." The learner uses a plurality of such data sets of training data and a label. Thus, the learner learns a plurality of relations between "image data" and the "type" of the image data, and obtains the learned model 123 for classifying the type of input image data when the image data is input. The learned model 123 created in such a way expresses the relation between the image data and the type of the image data in terms of a parameter. The classifier 115 classifies the type of the image data 121 by the learned model 123 created by machine learning in this way.

A plurality image data provided here as teaching data include "wrinkle images," "spot images," and "water drop images" in a ratio appropriate and necessary for learning without deviation toward any of them. Also, when they are divided into a data set for learning and a data set for evaluation, "wrinkle images," "spot images," and "water drop images" are selected without deviation toward any of them so that these data sets are included in equal proportions.

<Processing for Evaluation of Repellent>

Figure 14:
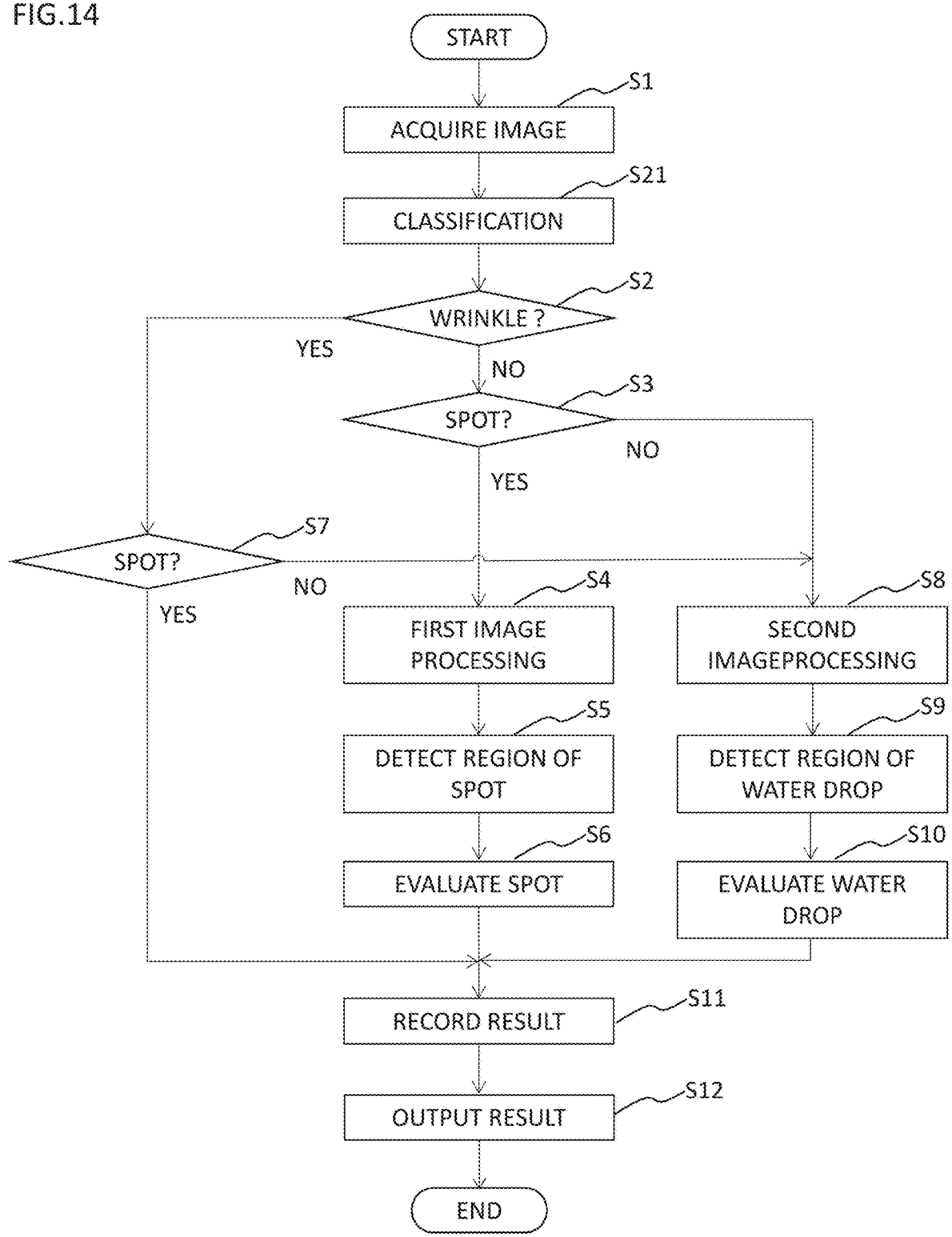
FIG. 14 is a flowchart illustrating the processing in the repellent evaluation device shown in FIG. 12.

Processing for evaluation of a repellent in the repellent evaluation device 1B will be described with reference to a flowchart shown in FIG. 14. In the flowchart in FIG. 14, the same processing as in the flowchart shown in FIG. 8 is given the same reference number of the step and description therefor will be omitted. Specifically, the flowchart shown in FIG. 14 is different from the flowchart shown FIG. 8 in that step S21 of classifying is added.

The classifier 115 classifies the types of the image data 121 acquired in step S1 (S21). Then, the detector 112 utilizes the result of the classification by the classifier 115 to determine whether or not the image data 121 includes data on wrinkle (S2), and processing of step S3 and the subsequent steps are continued.

In this way, the types of the image data 121 can be classified using a learned model in the repellent evaluation device 1B. In the repellent evaluation device 1B, any influence that is included in the image data but is not relevant to the performance of a repellent can be eliminated by performing image processing according to the type of the classified image. Thus, the repellent evaluation device 1B utilizes numeric calculation of, for example, the area ratio of a spot or the number of water drops to enable quantitative evaluation of the performance of a repellent.

Modification Example 1

For the above embodiments, a case where detection of the region of a spot is performed on an image that has applied the first image processing has been described for a substrate including a spot. In contrast, detection may be performed using different methods between a substrate including a spot extending over a broad area and a substrate including a small amount of spots, whereby the region of the spot can be detected accurately. Accordingly, a repellent evaluation device according to Modification Example 1 uses different methods for detection of a spot after the first image processing depending on whether or not the spot extends over a broad area. The repellent evaluation device according to Modification Example 1 has the same configuration as the repellent evaluation device 1A described hereinbefore with reference to FIG. 2 or the repellent evaluation device 1B described hereinbefore with reference to FIG. 12. Accordingly, FIG. 2 will be referred for description below.

Figure 15:
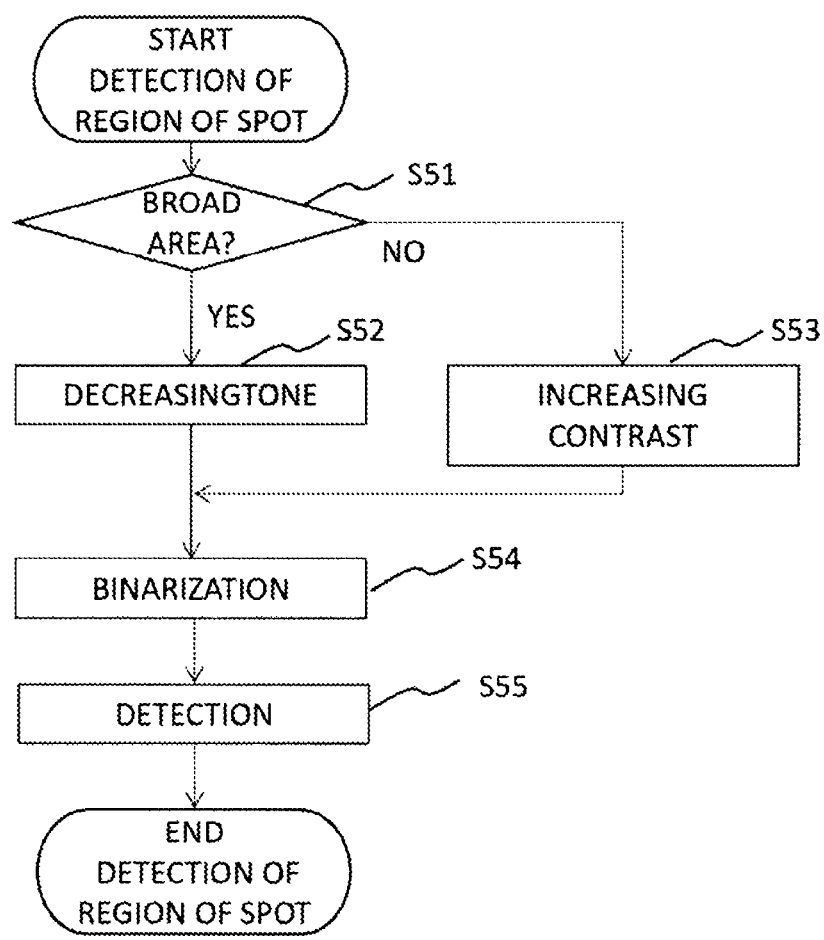
FIG. 15 is a flowchart illustrating the detection of a region of a spot in a repellent evaluation device according to Modification Example 1.

Processing for evaluation of a repellent in the repellent evaluation device according to Modification Example 1 will be described with reference to a flowchart shown in FIG. 15. The difference between processing in the repellent evaluation device according to Modification Example 1 and the processing described above with reference to FIG. 14 is in detection of a spot in step S5. As shown in FIG. 15, the detector 112 determines whether or not the region of a spot extends over a broad area (S51).

In a case where a spot generated on a substrate extends over a broad area (if YES in S51), the detector 112 performs decreasing the tone (S52) and then performs binarization (S54). Specifically, the detector 112 does not express the grayscale image data in terms of brightness values of 0 to 255, but convert it into image data expressed in terms of less than 256 shades of gray. At this time, the detector 112 automatically extracts the representative brightness value from the image data using k-means clustering, which is unsupervised learning, and also converts into image data with the extracted tone. Average quantization or split middle technique, which is also unsupervised learning, may be utilized instead of k-means clustering. In that way, the brightness value of the portion of the spot can be differentiated from that of the portion without spot.

Figure 16A:
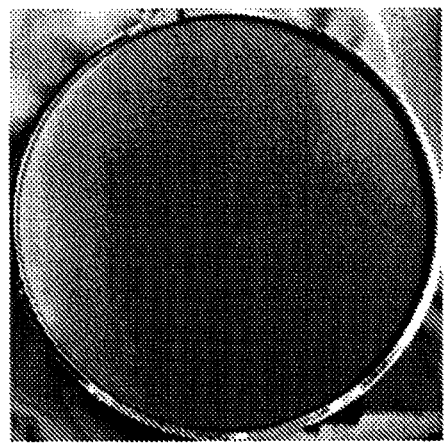
FIG. 16A is a grayscale image of a substrate including a spot extending over a broad area.
Figure 16B:
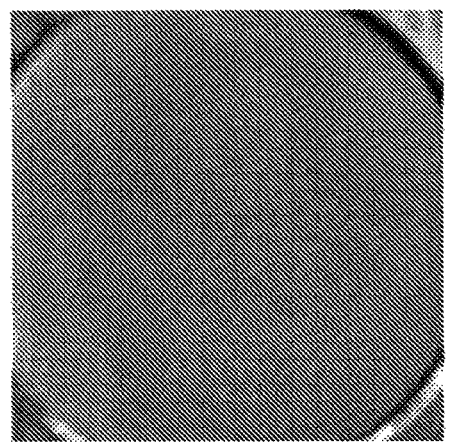
FIG. 16B is an image obtained by performing the first image processing on the image data in FIG. 16A.
Figure 16C:
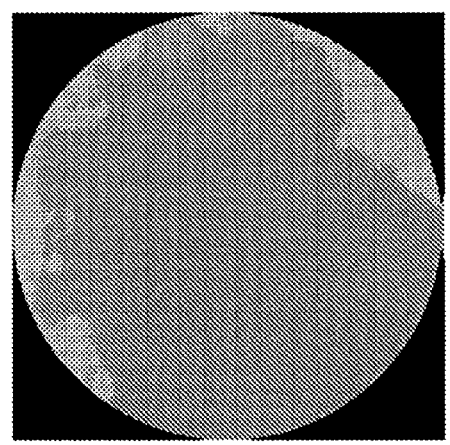
FIG. 16C is an image obtained by decreasing the tone of the image data in FIG. 16B.

FIG. 16A shows an example of the image data 121 in a case where a spot extends over a broad area. In the example shown in FIG. 16A, a spot is broadly generated in the center portion of a substrate, and no spot is generated only in part of the edge portion of the substrate. In contrast, FIG. 16B is an example obtained by performing the first image processing on the image data 121 in FIG. 16A. FIG. 16C is an example obtained by decreasing the tone of the image data in FIG. 16B. Specifically, in FIG. 16C, the brightness value of the portion of a spot is designated as "the first brightness value", and "the second brightness value," which is the brightness value of the portion with no spot, is set lower than the first brightness value. In FIG. 16C, "the third brightness value," which is the brightness value of the background portion except the substrate, is set to 0. Accordingly, the whole of the image data is expressed in terms of three shades of gray.

Figure 16D:
FIG. 16D is an image obtained by binarizing the image data in FIG. 16C.

FIG. 16D is an example obtained by binarizing the image data in FIG. 16C. The threshold value utilized for this binarization is set between the first brightness value and the second brightness value. Accordingly, in the binarized image data obtained, the brightness of the portion of the spot and that of the background portion are each "black (0)," and the brightness of the portion with no spot is "white (255)," as shown in FIG. 16D.

On the other hand, in a case where a spot does not extend over a broad area, or in other words, in a case where a spot generated in a substrate is in a small amount (if NO in S51), the detector 112 performs increasing the contrast (S53), and then performs binarization (S54). For example, the detector 112 can use, for increasing the contrast, a conventional method for adjusting the contrast by using lookup table.

Figure 17A:
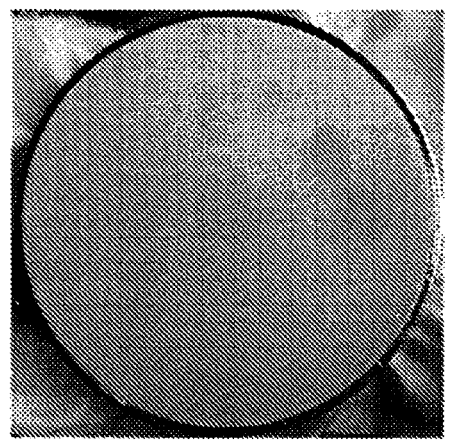
FIG. 17A is a grayscale image of a substrate including a small amount of spots.
Figure 17B:
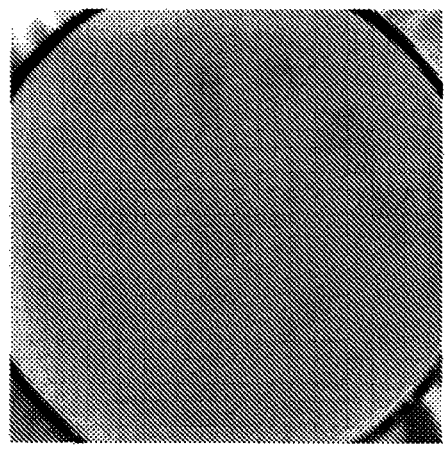
FIG. 17B is an image obtained by performing the first image processing on the image data in FIG. 17A.
Figure 17C:
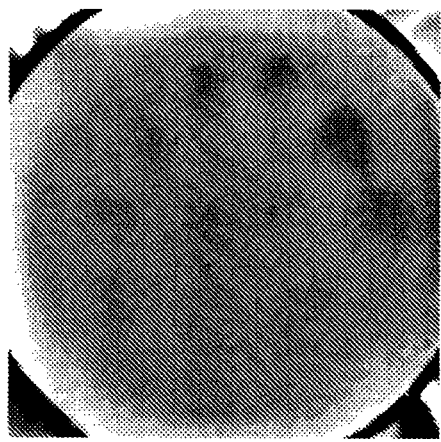
FIG. 17C is an image obtained by increasing the contrast of the image data in FIG. 17B.

FIG. 17A shows an example of the image data 121 in a case where a spot does not extend over a broad area, or specifically, in a case where the spot is in a small amount. In addition, FIG. 17B is an example obtained by performing the first image processing on the image data 121 in FIG. 17A. Furthermore, FIG. 17C is an example obtained by increasing the contrast of the image data in FIG. 17B. The region of a spot is inconspicuous in FIG. 17A and FIG. 17B, but the region of the spot becomes conspicuous through increasing the contrast.

Figure 17D:
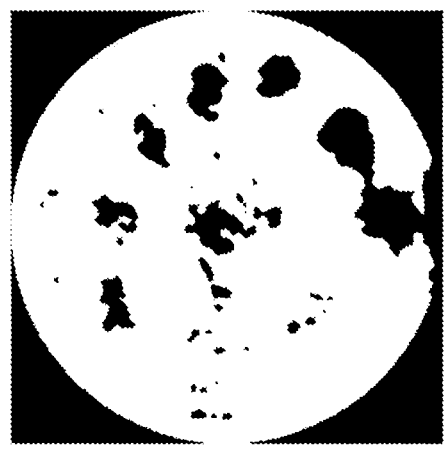
FIG. 17D is an image obtained by binarizing the image data in FIG. 17C.

FIG. 17D is an example obtained by binarizing the image data in FIG. 17C. For example, a predetermined brightness value is utilized as the threshold value utilized for this binarization.

The detector 112 detects the region of a spot from the binarized image obtained in step S54 (S55). Thus, the repellent evaluation device according to Modification Example 1 can detect the region of a spot precisely by binarizing an image that applied processing according to the extent of the spot. This enables improvement in accuracy of the evaluation of a repellent by the repellent evaluation device according to Modification Example 1.

Figure 16E:
FIG. 16E is an image obtained by increasing the contrast of the image data in FIG. 16B.
Figure 16F:
FIG. 16F is an image obtained by binarizing the image data in FIG. 16E.

If increasing the contrast is performed on the image data in FIG. 16B, the contrast is increased at the boundary line between the portion of a spot and the portion with no spot, as shown in FIG. 16E. FIG. 16F is an example obtained by binarizing the image data in FIG. 16E. As clear from this, if "increasing the contrast," which is processing for a small amount of spots, is performed on image data including data on a spot extending over a broad area instead of "decreasing the tone," which is processing for a spot extending over a broad area, the portion of a spot cannot be detected precisely, as shown in FIG. 16F.

Figure 17E:
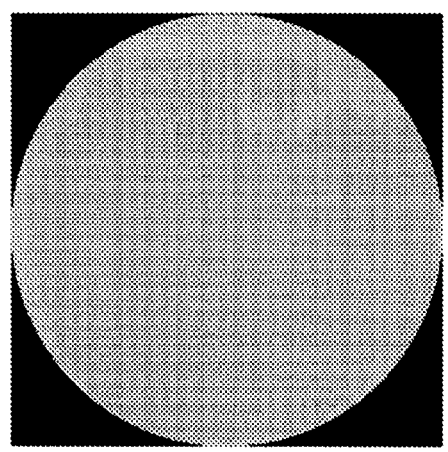
FIG. 17E is an image obtained by decreasing the tone of the image data in FIG. 17B.
Figure 17F:
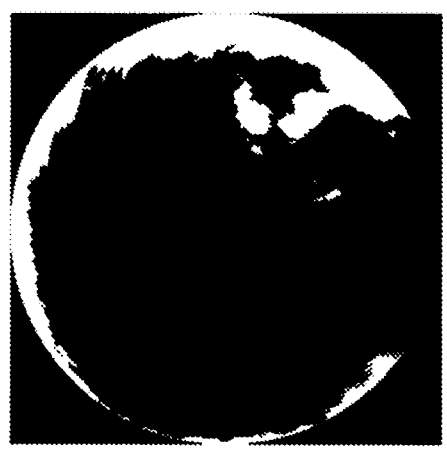
FIG. 17F is an image obtained by binarizing the image data in FIG. 17E.

In a case where reducing the color tone is performed on the image data in FIG. 17B, the contrast between the portion of a spot and the portion with no spot is low, as shown in FIG. 17E. FIG. 17F is an example obtained by binarizing the image data in FIG. 17E. As clear from this, if "decreasing the tone," which is processing for a spot extending over a broad area, is performed on image data including data on a small amount of spots instead of "increasing the contrast," which is processing for a small amount of spots, the portion of a spot cannot be detected precisely, as shown in FIG. 17F. Accordingly, when processing is performed on the image data 121, it is necessary to perform processing predetermined according to the amount of the spot.

The repellent evaluation device according to Modification Example 1 may acquire information whether or not the spot extends over a broad area at the same time as the image data 121 is acquired. Alternatively, an operator may select whether or not the spot extends over a broad area and input the selection to the repellent evaluation device according to Modification Example 1.

Modification Example 2

Figure 13:
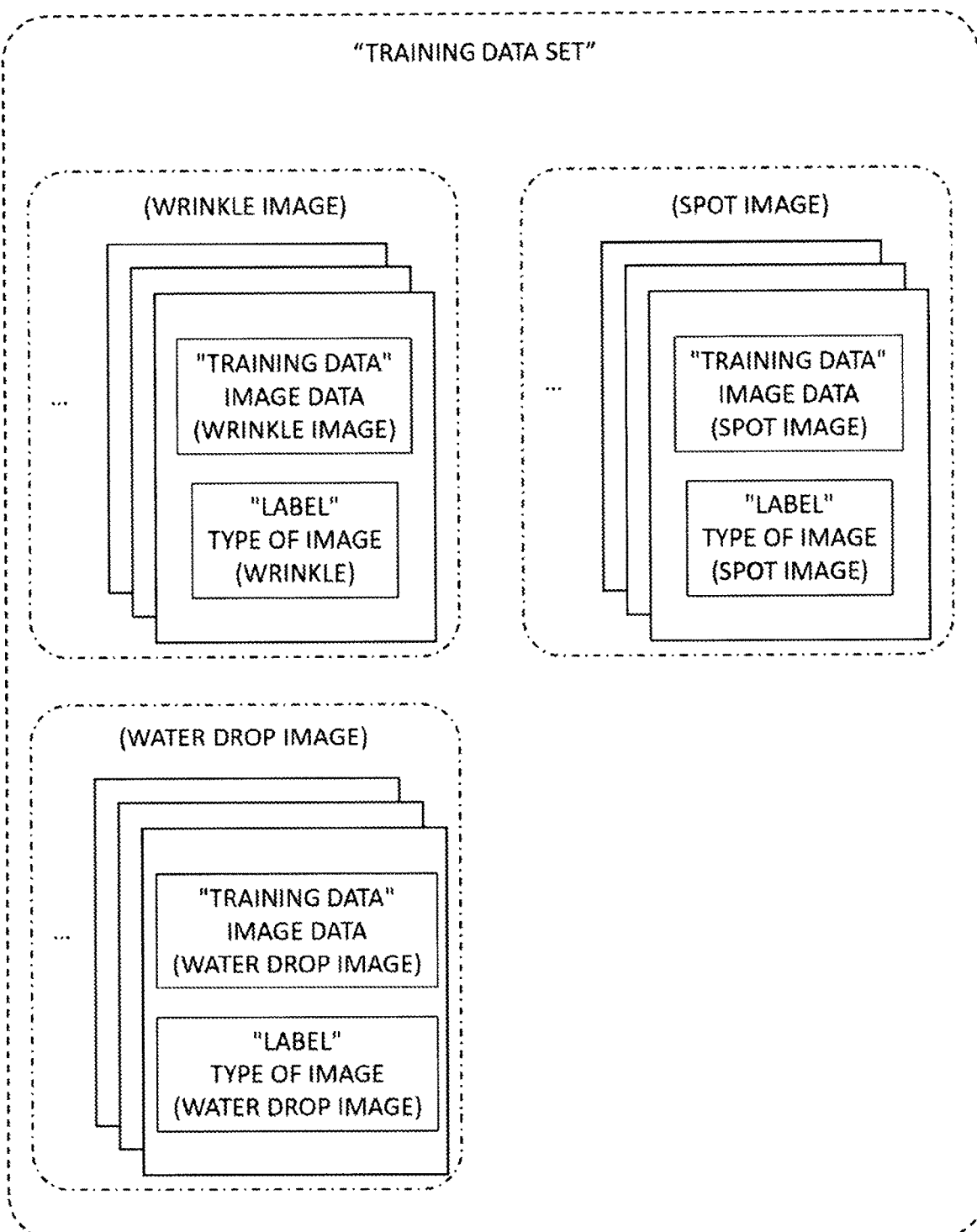
FIG. 13 is a diagram of a training data that is utilized by the repellent evaluation device according to Embodiment 2.
Figure 18:
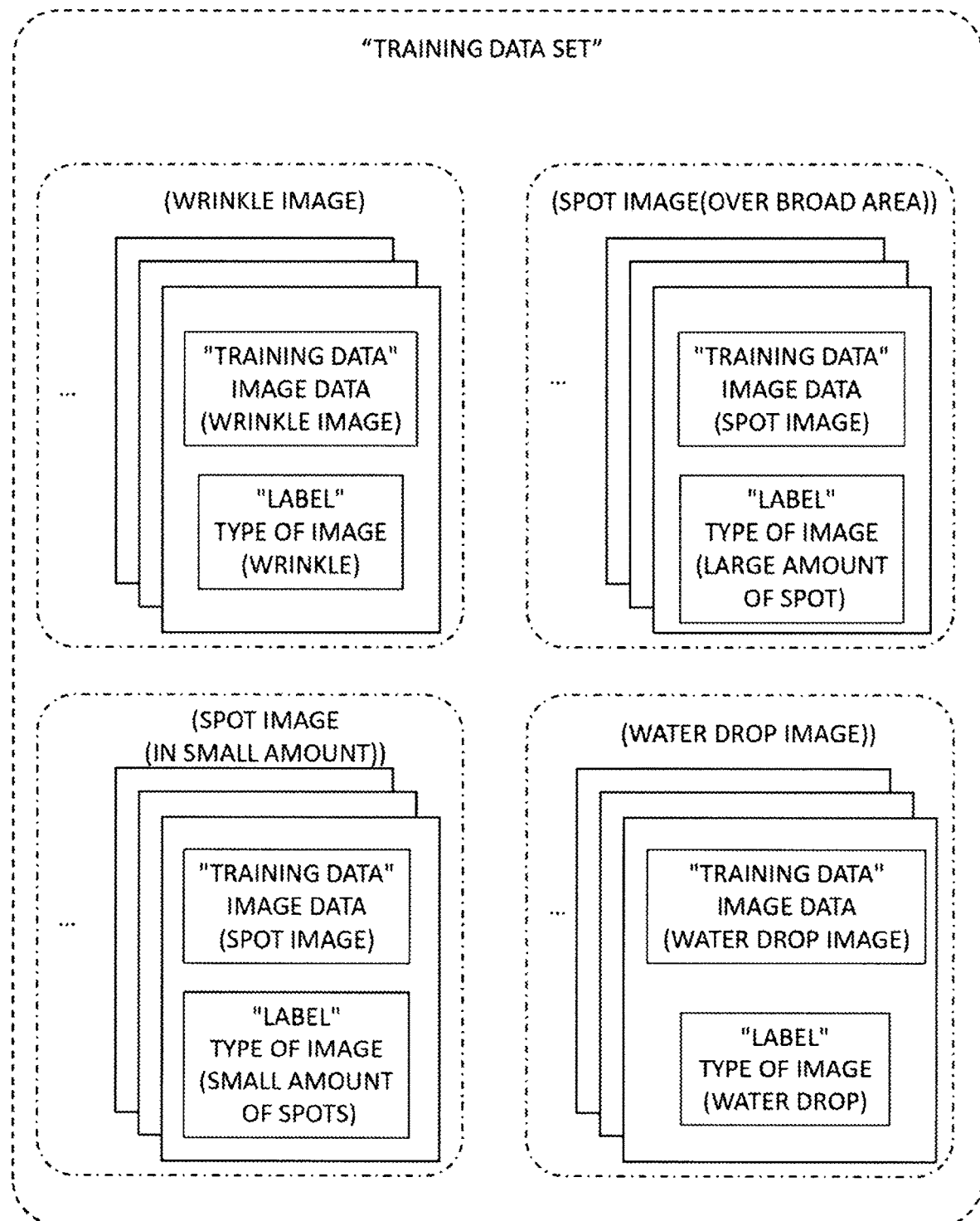
FIG. 18 is a diagram of a training data that is utilized by the repellent evaluation device according to Modification Example 2.

A case where a learner learns three types of training data: a "wrinkle image," a "spot image," and a "water drop image", as shown in FIG. 13, has been described for Embodiment 2. On the other hand, the repellent evaluation device according to Modification Example 1 further distinguishes and classifies a "spot image" into an "image of a spot extending over a broad area" and an "image of a small spot." Then, the repellent evaluation device according to Modification Example 2 performs machine learning of four types of training data including those for the repellent evaluation device according to Modification Example 1, as shown in FIG. 18. The repellent evaluation device according to Modification Example 2 has the same configuration as that of the device 1B for evaluating a repellent described hereinbefore with reference to FIG. 12, and will be described with reference to FIG. 12.

Training data as shown in FIG. 18 is input into classifier 115 in machine learning. Specifically, training data shown in FIG. 18 is data in which an "image of a spot extending over a broad area" and an "image of a small amount of spots" in the "spot image" in training data shown in FIG. 13 are distinguished from each other. Accordingly, a learning model created by training data shown in FIG. 18 classifies an input image into a "wrinkle image," an "image of a spot extending over a broad area," an "image of a small amount of spots," and a "water drop image."

The detector 112 performs image processing on the image data 121 according to the type classified by the classifier 115 to detect each region.

Figure 19:
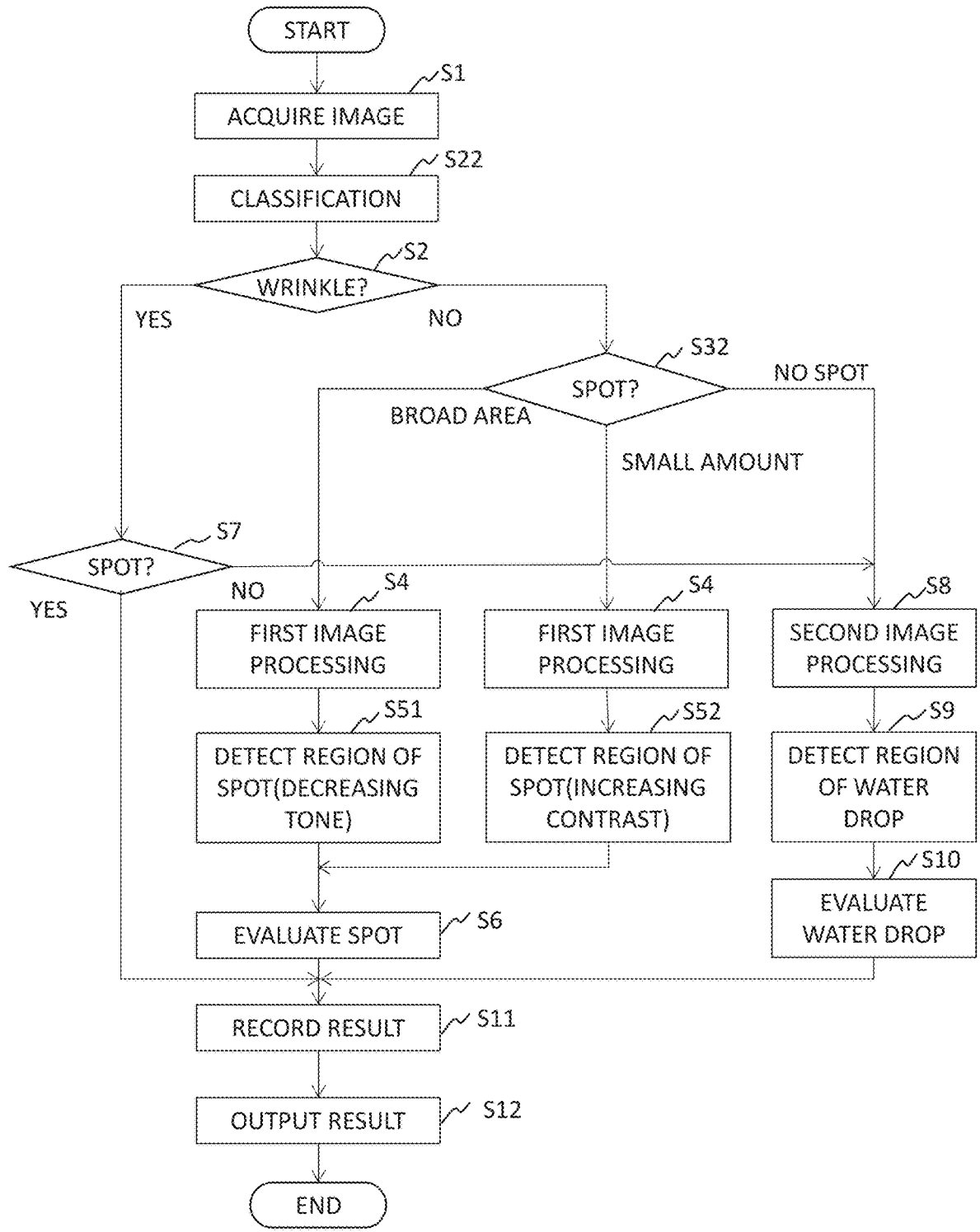
FIG. 19 is a flowchart illustrating the detection of a region of a spot in a repellent evaluation device according to Modification Example 2.

Processing for evaluation of a repellent in the repellent evaluation device according to Modification Example 2 will be described with reference to a flowchart shown in FIG. 19. For processing in the repellent evaluation device according to Modification Example 2, a different reference number for a step is given to only a step different from those described hereinabove with reference to FIG. 14, which will be described.

In classification, the classifier 115 classifies an image into a "wrinkle image," an "image of a spot extending over a broad area," an "image of a small amount of spots," and a "water drop image" (S22).

In a case where the image data 121 includes no data on a wrinkle (if NO in S2), the detector 112 determines the presence or absence of a spot and the amount of the spot (S32) since the subsequent processing is different depending on the presence or absence of a spot and the amount of the spot.

In a case where the spot extends over a broad area (if broad in S32), the detector 112 performs the first image processing in step S4 and then detects the region of a spot by the method as described above for Modified Example 1 (S51). Specifically, the detector 112 performs decreasing the tone of image data 121 that has applied the first image processing, then performs binarization, and detects the region of a spot. Thereafter, the evaluator 113 performs evaluation of a spot on the region of the spot extending over a broad area detected in step S51 (S6), as described hereinabove with reference to FIG. 8.

In a case where the spot is in a small amount (if in a small amount in S32), the detector 112 performs the first image processing in step S4, and then detects the region of a spot by the method described hereinabove for Modified Example 1 (S52). Specifically, the detector 112 performs increasing the contrast of the image data 121 that has applied the first image processing, then performs binarization, and detects the region of a spot. Thereafter, the evaluator 113 performs likewise evaluation of a spot on the region of the spot in a small amount detected in step S52 (S6).

In a case where any spot is absent (if no spot in S32), the detector 112 performs the second image processing (S8), detection of the region of a water drop (S9), and evaluation of water drop (S10), as described hereinabove with reference to FIG. 8.

In this way, the repellent evaluation device according to Modification Example 2 determines the type of the image data 121 among the four types by classification by the learned model, and can thus improve the accuracy of the evaluation of a repellent.

Other Modification Examples (Error According to Number of Water Drops)

As described hereinbefore, the number of water drops generated on a substrate that has treated with a repellent varies depending on the area of the substrate and the performance of the repellent. However, there is an ordinary value of the number of water drops to be usually generated on a given area, and the number of which or more water drops is to be seldom generated can be specified. Thus, when the number of water drops generated on the substrate is more than the given number specified for the area, there is a possibility that any error have been caused. Accordingly, the number of water drops assumed to be an error is set in advance as a threshold value, and if the number of water drops detected is the threshold value or more, the evaluator 113 evaluates such a case as an error. If the number of water drops is an error, the result processor 114 records the result as an error when recording the result. For the abnormally large number of water drops detected, the result may not be recorded in terms of the number but may be recorded as an error, whereby check by an operator or evaluation by an operator can be prompted.

(Error of Classification)

A case where classification is performed by the classifier 115 has been described for the above-described examples of the repellent evaluation device according to Embodiment 2 or Modification Example 2. However, there may be some cases where the classifier 115 cannot determine which type the image is classified as. For example, when the classifier 115 determines values respectively representing possibilities of corresponding to the class of a "wrinkle image," a "spot image," and a "water drop image," all the found values may be lower than a predetermined value, and in such a case, it is impossible to precisely determine which type the image is classified as. Specifically, when the values are each lower than a predetermined value, the reliability of the result of the classification by the classifier 115 is lower. If all the values are thus lower than the threshold values, the evaluator 113 records it as an error. For a case where the reliability of the classification is lower, the result obtained may not be recorded in terms of the classification but may be recorded as an error, whereby check by an operator or evaluation by an operator can be prompted.

(Relearning)

A case where the result processor 114 stores the evaluation value obtained by the evaluator 113 as result data 122 in the storage 12 has been described for the repellent evaluation device according to Embodiment 2 or Modification Example 2. On the other hand, the image data 121 to be stored can be associated with the result of the classification of this image data 121 obtained by classifier 115, and these can be stored in the storage 12 in an accumulative manner, whereby these can be utilized for relearning by the learned model 123 later. In this case, the storage 12 may memorize images that have applied various processing, in addition to the image data 121 acquired by the acquire 111. For example, the storage 12 may memorize a trimmed image obtained by extracting the portion of substrate of question, a binarized image, and so on.

Effect and Supplement

Hereinabove, each of the above embodiments has been described as illustration of the technique disclosed in the present application; however, the technique of the present disclosure is not limited thereto, and is applicable to any embodiments with appropriate change, replacement, addition, omission, and so on.

The spot evaluation method, the water drop evaluation method, the repellent evaluation method, and the repellent evaluation device, which are disclosed in all of claims of the present disclosure, can be practiced, for example, in cooperation with hardware resources such as processors, memory, and programs.

INDUSTRIAL APPLICABILITY

The spot evaluation method, the water drop evaluation method, the repellent evaluation method, and the repellent evaluation device of the present disclosure are useful for quantitative evaluation of the performance of a repellent, for example.

EXPLANATION OF REFERENCES 1A, 1B device for evaluating repellent
11 control unit
111 acquire
112 detector
113 evaluator
114 result processor
115 classifier
12 memory unit
121 image data
122 result data
123 learned model
P program for evaluation
13 communication unit
14 input unit
15 output unit

What is claimed is:

1. An evaluation method for evaluating a spot generated on a substrate that has been treated with a repellent, the method comprising:
   an acquiring step of acquiring image data including data on the substrate that has been treated with the repellent to be evaluated;
   a spot-detecting step of (1) creating a smoothed image from a grayscale image of the image data, (2) obtaining an image by, for each image pixel in the grayscale image, subtracting a brightness value of the smoothed image from a brightness value of the grayscale image and adding an average of the brightness value of the gray scale image, (3) binarizing the obtained image, and detecting a region of a spot generated on the substrate; and
   a spot-evaluating step of determining an evaluation value of the spot according to an area of the region of the spot detected.

2. A repellent evaluation method, the method being for evaluating performance of the repellent and comprising:
   an acquiring step of acquiring image data including data on a substrate that has been treated with the repellent to be evaluated;
   a detecting step of detecting at least one of a region of a spot or a region of a water drop on the substrate in the image data; and
   an evaluating step of determining an evaluation value of the performance of the repellent according to an area of the region of the spot detected or the number of the regions of the water drops detected,
   wherein the detecting step for detecting the region of the spot, (1) creating a smoothed image from a grayscale image of the image data, (2) obtaining an image by, for each image pixel in the grayscale image, subtracting a brightness value of the smoothed image from a brightness value of the grayscale image and adding an average of the brightness value of the grayscale image, (3) binarizing the obtained image, and detecting a region of a spot generated on the substrate, and
   wherein the detecting step for detecting the region of the water drop, creating an edge image based on whether or not the difference between the brightness values of adjacent image pixels of the image data is the predetermined value or more, and detecting the region of the water drop on the substrate based on the edge image.

3. The repellent evaluation method according to claim 2, wherein in the detecting step,
   when the substrate includes a spot, the region of the spot is detected from the image data that has applied a first image processing for spot image data, and
   when the substrate includes no spot, the region of a water drop is detected from the image data that has applied a second image processing for water drop image data.

4. The repellent evaluation method according to claim 3, wherein in the detecting step, a smoothed image data is created from the image data by the first image processing.

5. The repellent evaluation method according to claim 3, wherein in the detecting step, an edged image data is created from the image data by the second image processing.

6. The repellent evaluation method according to claim 2, further comprising a classifying step of classifying the image data as a spot image data when there are no wrinkle on the substrate in the image data and includes one or more spots, and classifying the image data as a water drop image data when the substrate includes a water drop with no spot.

7. The repellent evaluation method according to claim 6, wherein the classifying step achieves classifying the image data into a first spot image data and a second spot image data according to a spot-including pattern, and
in the detecting step, the region of a spot is detected by performing image processing different between a case where the image data is classified as the first spot image data and a case where the image data is classified as the second spot image data.

8. The repellent evaluation method according to claim 7, wherein in the detecting step, image processing for decreasing a tone is performed on the first spot image data, followed by performing binarization to detect the region of a spot, and image processing for increasing a contrast is performed on the second spot image data, followed by performing binarization to detect the region of a spot.

9. The repellent evaluation method according to claim 6, wherein in the classifying step, the image data acquired is used as input data, and the input data is classified by utilizing a model that has learned, by machine learning, a relation between a plurality of training image data including data on a substrate that has been treated with a repellent and a classification of the training image data.

10. A repellent evaluation device for evaluating performance of the repellent and comprising:
at least one of a processor or hardware circuitry configured to implement;
an acquirer that acquires image data including data on a substrate that has been treated with the repellent to be evaluated,
a classifier that classifies the image data as spot image data when the substrate includes a spot in the image data and classifies the image data as water drop image data when the substrate includes no spot in the image data,
a detector, wherein when the image data is spot image data, the detector (1) creates a smoothed image from a grayscale image of the image data, (2) obtains an image by, for each image pixel in the image, subtracting a brightness value of the smoothed image from a brightness value of the gray scale image and adding an average of the brightness value of the gray scale image, (3) binarizes the obtained image, and detecting a region of a spot generated on the substrate, and when the image data is water drop image data, the detector creates an edge image based on whether or not the difference between the brightness values of adjacent image pixels of the image data is the predetermined value or more, and detects the region of the water drop on the substrate based on the edge image, and
an evaluator that determines an evaluation value of the performance of the repellent according to an area of the region of a spot detected or the number of the regions of the water drops detected.

11. The repellent evaluation device according to claim 10, wherein the classifier uses the image data acquired by the acquirer as input data, and classifies the input data by utilizing a model that has learned, by machine learning, a relation between a plurality of training image data including data on a substrate that has been treated with the repellent and a classification of the training image data.

* * * * *